US011929606B2

(12) United States Patent
Zeng

(10) Patent No.: US 11,929,606 B2
(45) Date of Patent: Mar. 12, 2024

(54) SAFETY CONTROL CIRCUIT AND AUTOMOBILE EMERGENCY STARTING CLAMP PROVIDED WITH SAME

(71) Applicant: Dongguan Hang Che Bao Future Technology Co., Ltd., Dongguan (CN)

(72) Inventor: Guozhi Zeng, Lianyuan (CN)

(73) Assignee: Dongguan Hang Che Bao Future Technology Co., Ltd., Dongguan (CN)

(*) Notice: Subject to any disclaimer, the term of this patent is extended or adjusted under 35 U.S.C. 154(b) by 1 day.

(21) Appl. No.: 17/894,165

(22) Filed: Aug. 24, 2022

(65) Prior Publication Data

US 2023/0045869 A1 Feb. 16, 2023

(30) Foreign Application Priority Data

Jun. 6, 2022 (CN) ......................... 202210630622.7

(51) Int. Cl.

| | |
|---|---|
| ***H02H 3/20*** | (2006.01) |
| ***F02N 11/12*** | (2006.01) |
| ***H02H 5/04*** | (2006.01) |
| ***H02J 7/00*** | (2006.01) |

(52) U.S. Cl.

CPC ............... *H02H 3/20* (2013.01); *F02N 11/12* (2013.01); *H02H 5/04* (2013.01); *H02J 7/0029* (2013.01); *H02J 7/00308* (2020.01); *H02J 7/00309* (2020.01); *H02J 7/0047* (2013.01)

(58) Field of Classification Search

CPC ..................... F02N 11/12; H02J 7/0029–0036

See application file for complete search history.

(56) References Cited

U.S. PATENT DOCUMENTS

| | | | |
|---|---|---|---|
| 11,482,860 B1 * | 10/2022 | Zhu ......................... | H02J 7/342 |
| 2004/0201286 A1 | 10/2004 | Harvey et al. | |
| 2013/0113301 A1 | 5/2013 | Hashimoto et al. | |
| 2016/0285258 A1 * | 9/2016 | Wu ...................... | H02H 11/005 |
| 2017/0344089 A1 | 11/2017 | Mounier et al. | |
| 2020/0072177 A1 * | 3/2020 | Clarke .................. | H02J 7/0048 |

* cited by examiner

*Primary Examiner* — Jared Fureman
*Assistant Examiner* — Christopher J Clark
(74) *Attorney, Agent, or Firm* — Zhigang Ma

(57) ABSTRACT

The present disclosure discloses a safety control circuit and an automobile emergency starting clamp provided with the same. The safety control circuit is integrated with an EC5 input module, an ignition clip module, a relay module, a timing control module, an input high-voltage protection module, a voltage-stabilizing power supply module, an input low-voltage protection module, a high-temperature protection module, a low-temperature protection module, an error alarm module, a first timing module, a second timing module and a light display module, and has fast response and high safety. The automobile emergency starting clamp provided with the circuit includes an anode cable clamp, a cathode cable clamp and a control box; and the control box includes a control box upper shell, a control box lower shell, an on/off button and the above-mentioned safety control circuit.

10 Claims, 13 Drawing Sheets

SAFETY CONTROL CIRCUIT AND AUTOMOBILE EMERGENCY STARTING CLAMP PROVIDED WITH SAME

TECHNICAL FIELD

The present disclosure relates to the related technical field of automobile emergency starting power connection clamps, in particular to a safety control circuit and an automobile emergency starting clamp provided with the same.

BACKGROUND

In today's prosperous economic environment, whether it is used for family travel or long-distance passenger and cargo transportation, automobiles have entered people's life and become an indispensable part in daily life and work. Due to various reasons, such as long-distance passenger and cargo transportation, a self-driving tour and being on other busy roads, long-time or incorrect driving habits and self-consumption of power of an automobile caused by long-time parking easily lead to excessive feed of an automobile battery. As a result, the automobile fails in starting, which will severely affect life and work. If no auxiliary starting equipment is found in time, a user needs to pay a towing fee or more parking fees.

An existing automobile emergency starting clamp has the advantages of simple structure, slow response and low safety.

Therefore, it is necessary to provide a safety control circuit and an automobile emergency starting clamp with the same to solve the problems in the prior art.

SUMMARY

The present disclosure mainly aims to overcome the shortcomings in the prior art, and provides a safety control circuit and an automobile emergency starting clamp provided with same to solve the problems in the prior art.

In order to achieve the above-mentioned objective, the technical solutions provided according to the present invention are as follows: The safety control circuit includes an EC5 input module, an ignition clip module, a relay module, a timing control module, an input high-voltage protection module, a voltage-stabilizing power supply module, an input low-voltage protection module, a high-temperature protection module, a low-temperature protection module, an error alarm module, a first timing module, a second timing module and a light display module;

the EC5 input module includes an EC5+ terminal and an EC5− terminal;

the ignition clip module includes a red clip wire OUT+ network terminal, a black clip OUT− terminal, a diode D12 and a diode D19; the red clip wire OUT+ network terminal is connected to a first wire; the first wire is connected to OUT+ and is connected to one end of the diode D19 and an output end of the relay module at the same time; an input end of the relay module is connected to a second wire; the other end of the second wire is connected to the EC5+ terminal; the other end of the diode D19 is connected to a Negative Temperature Coefficient (NTC) resistor; the black clip OUT− terminal is connected to a third wire; the third wire is connected to an OUT− network and is connected to one end of the diode D12 at the same time; the other end of the diode D12 is grounded; the other end of the third wire is connected to the EC5− terminal;

the EC5+ terminal is also connected to a VCC+ network, the voltage-stabilizing power supply module and the input high-voltage protection module;

the relay module includes a relay RK3, a diode D6, a diode D7, a triode Q1, a resistor R7, a resistor R44, a triode Q2, and a resistor R4; while pin 3 of the relay RK3 is connected to the VCC+ network, after pin 3 is connected to the diode D6, the diode D7 and pin 2 of the triode Q1 in series, pin 1 of the triode Q1 is connected to pin 2 of the resistor R44; pin 3 of the triode Q1 is grounded; pin 1 of the resistor R7 is connected to pin 3 of the triode Q1; after pin 2 of the resistor R7 is connected to pin 2 of the triode Q2, pin 1 of the triode Q2 is connected to pin 2 of the resistor R4; pin 1 of the resistor R4 and pin 3 of the triode Q2 are grounded; pin 2 of the relay RK3 is set as an output end of the relay module; pin 1 of the relay RK3 is set as an input end of the relay module;

the voltage-stabilizing power supply module includes a diode D1, a capacitor C1, a capacitor C2, a three-terminal voltage-stabilizing chip U3, a capacitor C3, a capacitor C6, and a filter capacitor CE3; one end of the diode D1 is connected to the EC5+ terminal, and the other end is connected to a VIN terminal of the three-end voltage-stabilizing chip U3; the capacitor C1 and the capacitor C2 are connected in parallel to the VIN terminal and a GND terminal of the three-terminal voltage-stabilizing chip U3; the capacitor C3, the capacitor C6 and the filter capacitor CE3 are all connected in parallel to the GND terminal and an OUT terminal of the three-terminal voltage-stabilizing chip U3; the GND terminal of the three-terminal voltage-stabilizing chip U3 is grounded; one end of the capacitor C1 is connected to pin 3 of the three-terminal voltage-stabilizing chip U3, and the other end is connected to pin 2 of the three-terminal voltage-stabilizing chip U3; pin 3 of the three-terminal voltage-stabilizing chip U3 is also connected to a VCC1 power supply voltage;

the input high-voltage protection module includes a zener diode ZD1, a zener diode ZD2, a diode D9, a diode D13, a resistor R13 and a resistor R21; the zener diode ZD2 is connected in series with the diode D9, the diode D13, the resistor R21, the diode D13 and the zener diode ZD1 in sequence, and the other end of the zener diode ZD1 is connected to the OUT+ network;

the input low-voltage protection module includes a diode D5, a diode D4, a resistor R16, an output signal LV, an operational amplifier LM-358, a capacitor C4, a resistor R15, a capacitor C8, a capacitor C19, a capacitor C22, a capacitor C13, a capacitor C21, a resistor R24, a diode D11, the VCC1 power supply voltage, a diode D17, a resistor R26, a triode Q5, a resistor R33, a resistor R19, a capacitor C11, a resistor R8, a resistor R19 and a capacitor C5; the operational amplifier LM-358 includes a VDD terminal of pin 8, a + terminal of pin 5, a − terminal of pin 6, a U1-B terminal of pin 7 and a GND terminal of pin 4; the diode D5, the diode D4 and resistor R16 are connected in series in sequence; pin 7 of the operational amplifier LM-358 is connected to a control signal LV; the U1-B terminal of pin 7 and the + terminal of pin 5 of the operational amplifier LM-358 are respectively connected in parallel to two ends of the diode D4 and the resistor R16; the GND terminal of pin 4 of the operational amplifier LM-358 is grounded; the VDD terminal of pin 8 of the operational amplifier LM-358 is connected to the OUT terminal of pin 1 of the three-terminal voltage-stabilizing chip U3 in the voltage-stabilizing power supply module; the − terminal of pin 6 of the operational amplifier LM-358 is connected in series with the resistor R24, the diode D11 and the VCCC1 power supply voltage in sequence; the resistor R15, the capacitor C8, the capacitor C19, the capacitor C22, the capacitor C13 and the capacitor C21 are all connected in parallel to the VVD terminal of pin 8 and the − terminal of pin 6 of the operational amplifier LM-358; the capacitor C4 and the resistor R15 are connected in series; the resistor R26 is connected in series with the diode D17, pin 2 of the triode Q5 and pin 3 of the triode Q5 in sequence and is then connected in parallel to pin 6 of the operational amplifier LM-358 and the VDD terminal of pin 8 of the operational amplifier LM-358; pin 1 of the triode Q5 is grounded after being connected in series to the resistor R19 and the capacitor C11; two ends 2 and 1 of the resistor R33 are respectively connected in parallel to pin 3 of the triode Q5 and end 1 of the resistor R19; after being connected in series, the capacitor C5 and the resistor R8 are respectively connected to end 2 of the resistor R16 and the OUT terminal of pin 1 in the three-terminal voltage-stabilizing chip U3 in the voltage-stabilizing power supply module; two ends of the resistor R9 are respectively connected to the capacitor C5 and end 1 of the resistor R8; end 1 of the resistor R9 is grounded after being connected to the capacitor C5;

the high-temperature protection module includes a network OT, a diode D3, a diode D8, a temperature comparator U1-A, a resistor R18, an NTC resistor, a capacitor C10, a resistor R3, a capacitor C9, a resistor R10, a resistor R14 and a VDD power supply voltage; the diode D3 is connected to pin 1 of the temperature comparator U1-A; pin 2 of the temperature comparator U1-A is connected to the OUT terminal of pin 1 in the three-terminal voltage-stabilizing chip U3 in the voltage-stabilizing power supply module after being connected to the resistor R3; the network OT is connected in series to the diode D8 and the resistor R18 in sequence; the network OT and pin 2 of the resistor R18 are respectively connected to the diode D3 and pin 3 of the temperature comparator U1-A; pin 2 of the NTC resistor is grounded; pin 1 of the NTC resistor is connected to pin 1 of the resistor R3; the capacitor C10 is connected in parallel to two ends of pin 2 and pin 1 of the NTC resistor; pin 3 of the temperature comparator U1-A is connected in series to the resistor R14 and the VDD power supply voltage; pin 2 of the resistor R10 is grounded; pin 1 of the resistor R10 is connected to pin 1 of the resistor R14; the capacitor C9 is connected in parallel to two ends of pin 1 and pin 2 of the resistor R10;

the timing control module includes a resistor R28, a resistor R34, a triode Q7, a triode Q3, a resistor R35 and a resistor R36; pin 2 of the triode Q3 is connected to pin 1 of the resistor R44 and pin 2 of the triode Q7; pin 1 of the triode Q3 is connected to pin 2 of the resistor R36 and pin 1 of the resistor R35; pin 1 of the resistor R36 is connected to a VDD network; pin 2 of the resistor R35 is grounded; pin 1 of the triode Q7 is connected to pin 1 of the resistor 28 and pin 2 of the resistor R34; pin 1 of the resistor R34 is connected to pin 3 of the triode Q7;

the first timing module includes a PM network, a resistor R31, a diode D18, a chip U2, a V1 network, a capacitor C14, a capacitor C16, a capacitor C17, a diode D14, a diode D15, a resistor R30, a resistor R32, a resistor R29, a photoelectric coupler PC1, a resistor R2, a diode D16, a resistor R38, a Metal Oxide Semiconductor (mos) transistor Q8 and a forced power-on module; the forced power-on module includes a triode Q9, a resistor R39, a filter capacitor CE2, a resistor R40, and a button switch K1; pin 3 of the triode Q9 is grounded; pin 1 of the triode Q9 is connected to pin 1 of the resistor R39; pin 2 of the resistor R39 is connected to pin 1 of the resistor R40; pin 2 of the resistor R40 is connected to pin 2 of a button switch K1; pin 1 of the button switch K1 is connected to the VDD network; pin 1 of the filter capacitor CE2 is connected to pin 2 of the resistor R39 and pin 1 of the resistor R40; pin 2 of the filter capacitor CE2 is grounded; pin 1 of the resistor R31 is connected to pin 1 of the resistor R44 and the PM network; pin 2 of the resistor R31 is connected to pin 3 of the chip U2; the diode D18 is connected in parallel to the resistor R31; pin 5 of the chip U2 is grounded after being connected to the capacitor C14; pin 2 of the chip U2 is simultaneously connected to pin 6 of the chip U2, one end of the capacitor C17, one end of the diode D14 and one end of the diode D15; the other end of the capacitor C17 is grounded; the other end of the diode D15 is connected to pin 2 of the resistor R30; pin 1 of the resistor R30 is connected to pin 2 of the resistor R32; pin 1 of the resistor R32 is simultaneously connected to one end of the capacitor C16, pin 4 of the chip U2, pin 8 of the chip U2 and pin 3 of the mos transistor Q8; the other end of the capacitor C16 is grounded; pin 7 of the chip U2 is simultaneously connected to the other end of the diode D14, pin 1 of the resistor R30 and pin 2 of the resistor R32; pin 1 of the mos transistor Q8 is simultaneously connected to pin 4 of the photoelectric coupler PC1, pin 2 of the resistor R38 and pin 2 of the triode Q9 in the forced power-on module; pin 1 of the resistor R38 is connected to pin 2 of the mos transistor Q8 and the VDD network; pin 3 and pin 2 of the photoelectric coupler PC1 are respectively grounded; pin 1 of the photoelectric coupler PC1 is simultaneously connected to pin 2 of the resistor R29 and pin 1 of the resistor R2; pin 1 of the resistor R29 is grounded; pin 2 of the resistor R2 is connected to one end of the diode D16;

the low-temperature protection module includes a resistor R11, a zener diode ZD3, a resistor R20, a photoelectric coupler PC3, an NTC network, a triode U4, a capacitor C7 and a resistor R45; pin 2 of the zener diode ZD3 is connected to the other end of the diode D16; pin 1 of the zener diode ZD3 is simultaneously connected to the OUT+ network and pin 1 of the resistor R20; pin 2 of the resistor R20 is connected to pin 2 of the photoelectric coupler PC3; pin 3 of the photoelectric coupler PC3 is grounded; pin 4 of the photoelectric coupler PC3 is connected to the NTC; pin 1 of the photoelectric coupler PC3 is connected to the OUT− network; pin 2 of the resistor R11 is connected to pin 1 of the resistor R4; pin 1 of the resistor R11 is grounded;

the second timing module includes a capacitor C15, a resistor R22, a resistor R23, a triode Q32, a resistor R41, a V1 network, a diode D10, a filter capacitor CE1, a resistor R37, and a triode Q6; pin 3 of the triode Q32 is simultaneously connected to pin 1 of the resistor R41 and pin 2 of the resistor R22; pin 2 of the resistor R41 is connected to the V1 network; pin 1 of the resistor R22 is simultaneously connected to pin 1 of R23 and one end of the capacitor C15; the other end of the capacitor C15 is grounded; pin 2 of the triode Q32 is connected to one end of the diode D10; the other end of the diode D10 is simultaneously connected to pin 1 of the filter capacitor CE1 and pin 1 of the resistor R37; pin 2 of the filter capacitor CE1 is grounded; pin 2 of the resistor R37 is connected to pin 1 of the triode Q6; pin 3 of the triode Q6 is grounded; pin 2 of the triode Q6 is connected to pin 1 of the triode Q3;

the error alarm module includes a resistor R17, a triode Q10, a diode D2, a resistor R5 and a buzzer; pin 1 of the resistor R17 is connected to pin 1 of the resistor R4; pin 2 of the resistor R17 is connected to pin 1 of the triode Q10; pin 3 of the triode Q10 is grounded; pin 2 of the triode Q10 is connected to pin 2 of the buzzer; two ends of the diode D2 are respectively connected to pin 1 and pin 2 of the buzzer; pin 2 of the resistor R5 is connected to pin 1 of the buzzer; pin 1 of the resistor R5 is connected to the VDD network;

the light display module includes a resistor R42, a triode Q13, a capacitor C25, a triode Q14, a resistor R43, a resistor R6, a triode Q11, a resistor R12, a red light LED3, a capacitor C18, a resistor R27, a triode Q12, a resistor R1, a capacitor C23 and a green light LED1; pin 1 of the resistor R42 is connected to pin 1 of the resistor R4; pin 2 of the resistor R42 is connected to pin 1 of the triode Q13; pin 3 of the triode Q13 is grounded; pin 2 of the triode Q13 is simultaneously connected to pin 1 of the triode Q12, pin 2 of the resistor R27 and one end of the capacitor C18; pin 3 of the triode Q12 is connected to pin 3 of the triode Q11 and grounded; pin 2 of the triode Q12 is simultaneously connected to pin 2 of the resistor R1 and one end of the capacitor C23; the other end of C23 is simultaneously connected to pin 2 of the triode Q14, pin 1 of the triode Q11 and pin 2 of the resistor R6; pin 2 of the triode Q11 is simultaneously connected to the other end of the capacitor C18 and pin 1 of the resistor R12; pin 2 of the resistor R12 is connected to one end of the red light LED3; pin 1 of the resistor R1 is connected to one end of the green light LED1; pin 1 of the resistor R6 is connected to VDD after being connected to the other end of the red light LED3, pin 1 of the resistor R27 and the other end of the green light LED1; pin 3 of the triode Q14 is grounded and is connected to one end of the capacitor C25 at the same time; the other end of the capacitor C25 is simultaneously connected to pin 1 of the triode Q14 and pin 2 of the resistor R43; and pin 1 of the resistor R43 is connected to the PM network.

As a further solution of the present disclosure, the model number of the three-terminal voltage-stabilizing chip U3 is 78L05.

As a further solution of the present disclosure, the model number of the D9 and the D3 is 1N4148.

As a further solution of the present disclosure, a resistance value of the resistor R15 is set to be 200 K.

As a further solution of the present disclosure, the model number of the triode Q6 is 8050.

As a further solution of the present disclosure, the model number of the diode D18 is IN5189.

As a further solution of the present disclosure, the model number of the mos transistor Q8 is 2301.

As a further solution of the present disclosure, the model number of the buzzer is 5V/D1295.

The present disclosure further provides an automobile emergency starting clamp which is cooperatively used with an automobile emergency power supply. The automobile emergency starting clamp includes an anode cable clamp provided with a red clip wire OUT+ terminal; a cathode cable clamp provided with a black clip OUT− terminal; and a control box. The control box includes a control box upper shell, a control box lower shell, an on/off button and the above-mentioned safety control circuit.

As a further solution of the present disclosure, the control box upper shell and the control box lower shell are located above and below and are fixedly connected to each other; the safety control circuit is arranged between the control box upper shell and the control box lower shell; and the on/off button is arranged on one side of the control box upper shell and is in contact connection with the button switch K1 of the safety control circuit.

Compared with the prior art, the present disclosure has the following beneficial effects.

This safety control circuit is integrated with an EC5 input module, an ignition clip module, a relay module, a timing control module, an input high-voltage protection module, a voltage-stabilizing power supply module, an input low-voltage protection module, a high-temperature protection module, a low-temperature protection module, an error alarm module, a first timing module, a second timing module and a light display module, and features with fast response and high safety. The automobile emergency starting clamp provided with the circuit includes an anode cable clamp provided with a red clip wire OUT+ terminal; a cathode cable clamp provided with a black clip OUT− terminal; and a control box; and the control box includes a control box upper shell, a control box lower shell, an on/off button and the above-mentioned safety control circuit. The automobile emergency starting clamp can automatically detect a voltage of an automobile battery and automatically detect whether the cable clamp falls off; when the automobile battery is excessively fed, making the automobile fails in starting, the present disclosure ensures safe connection between the automobile battery and an automobile emergency starting power supply, thus achieving beneficial effects of small size, portability, rich function and high applicability.

Figure 1:
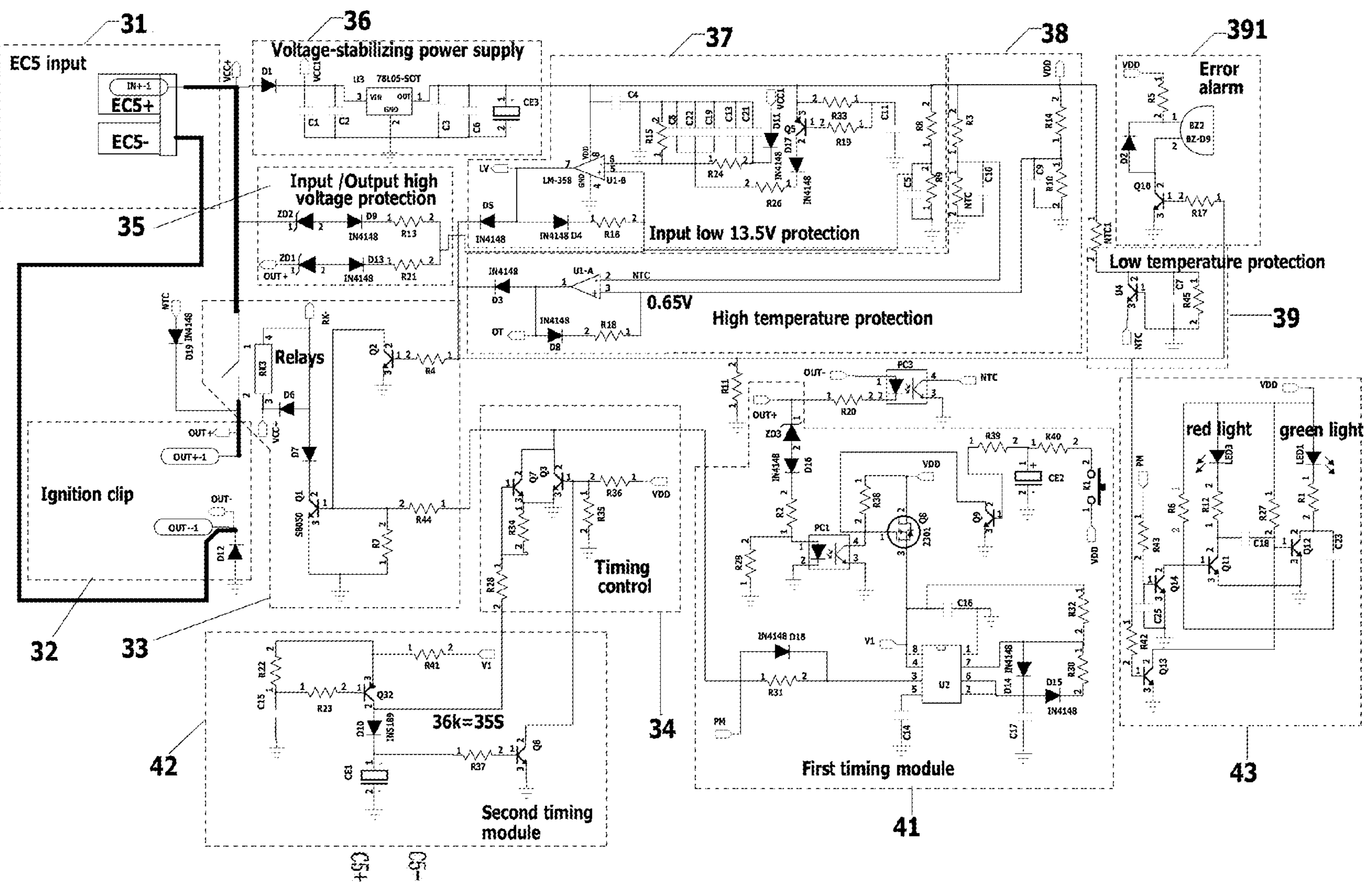
FIG. 1 is a schematic diagram of a design of a safety control circuit of a safety control circuit and an automobile emergency starting clamp provided with the circuit according to the present disclosure.
Figure 2:
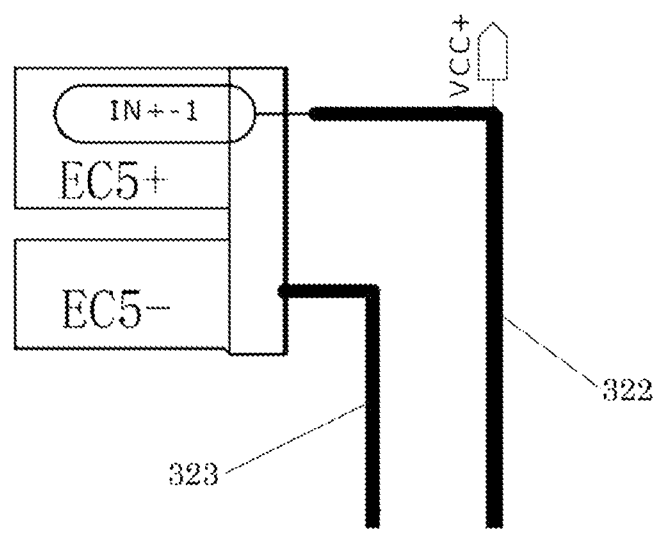
FIG. 2 is a schematic diagram of circuit connection of an EC5 input module of a safety control circuit and an automobile emergency starting clamp provided with the circuit according to the present disclosure.
Figure 3:
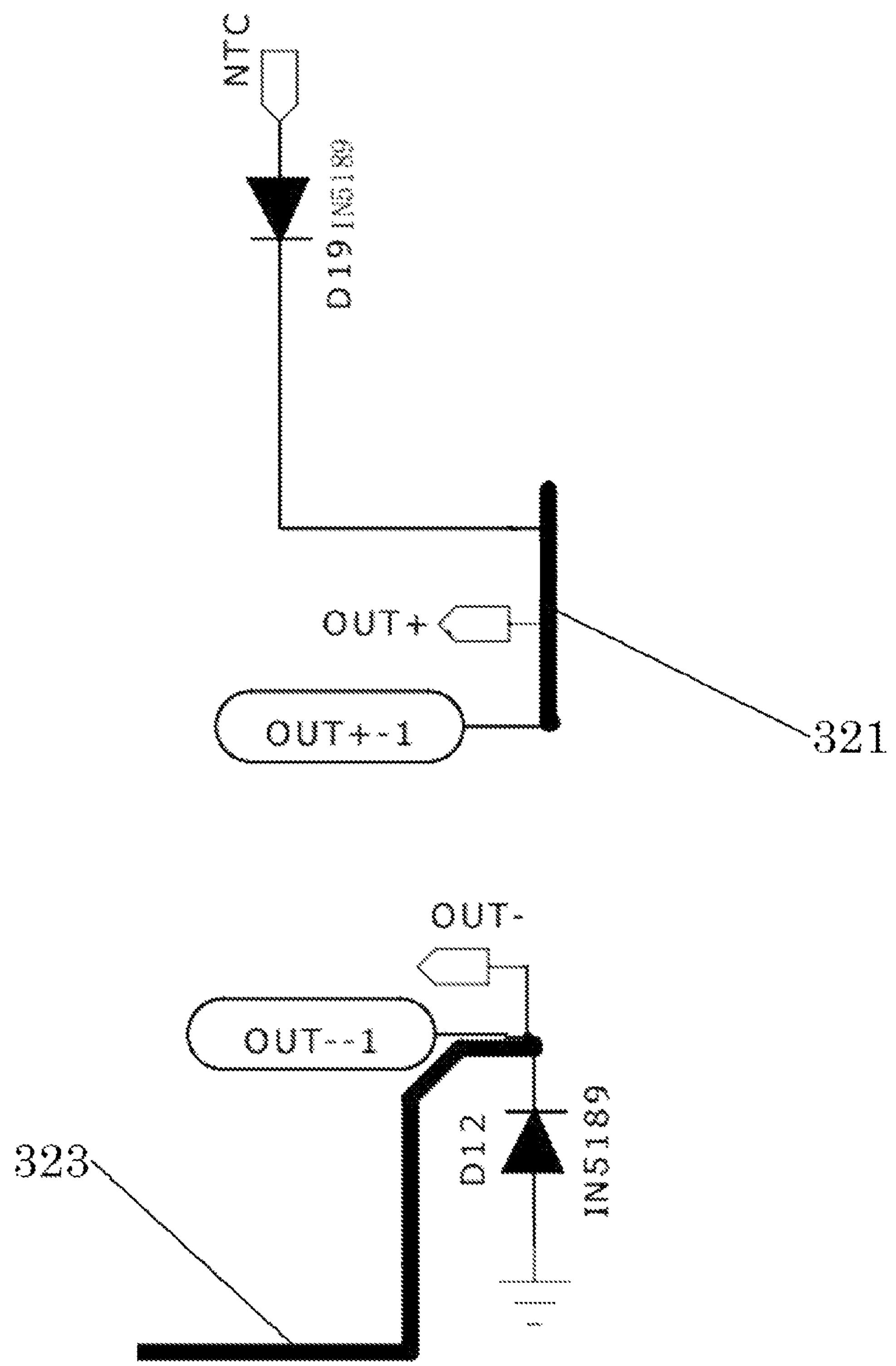
FIG. 3 is a schematic diagram of circuit connection of an ignition clip module of a safety control circuit and an automobile emergency starting clamp provided with the circuit according to the present disclosure.
Figure 4:
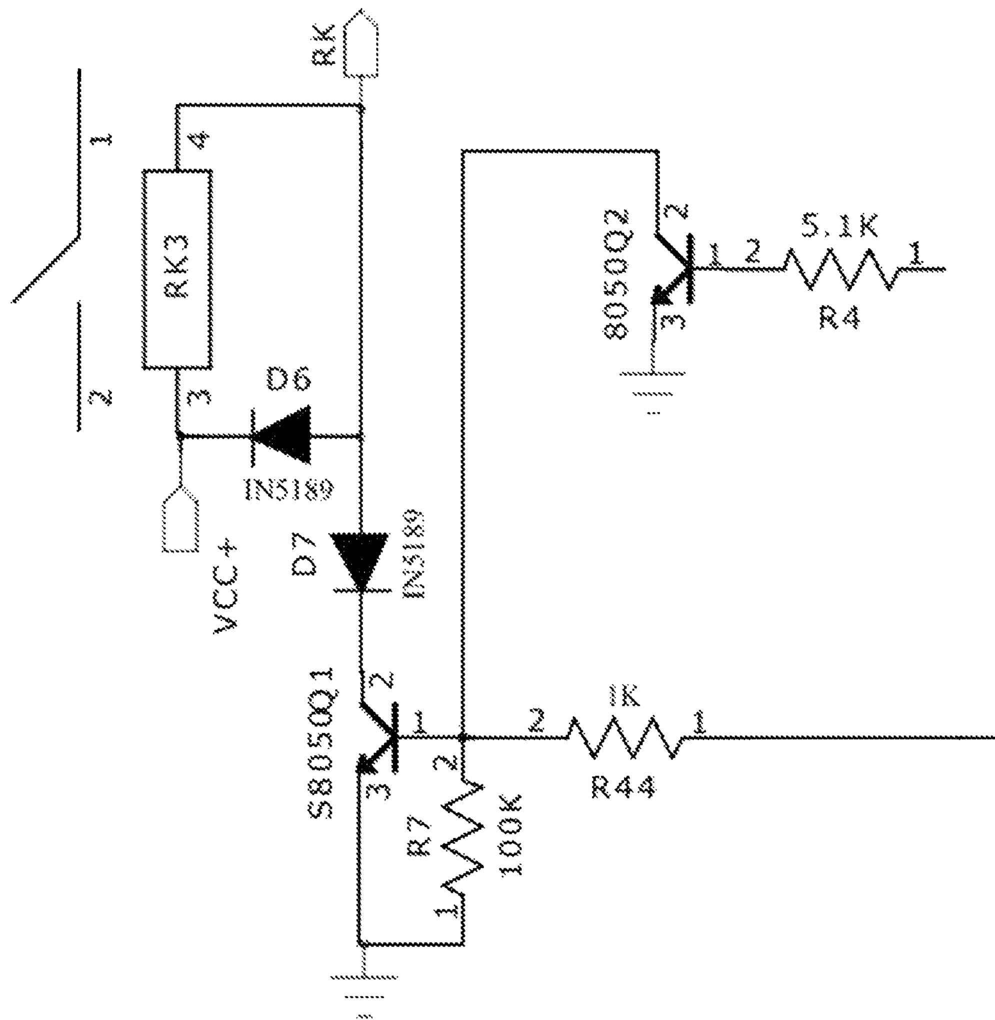
FIG. 4 is a schematic diagram of circuit connection of a relay module of a safety control circuit and an automobile emergency starting clamp provided with the circuit according to the present disclosure.
Figure 5:
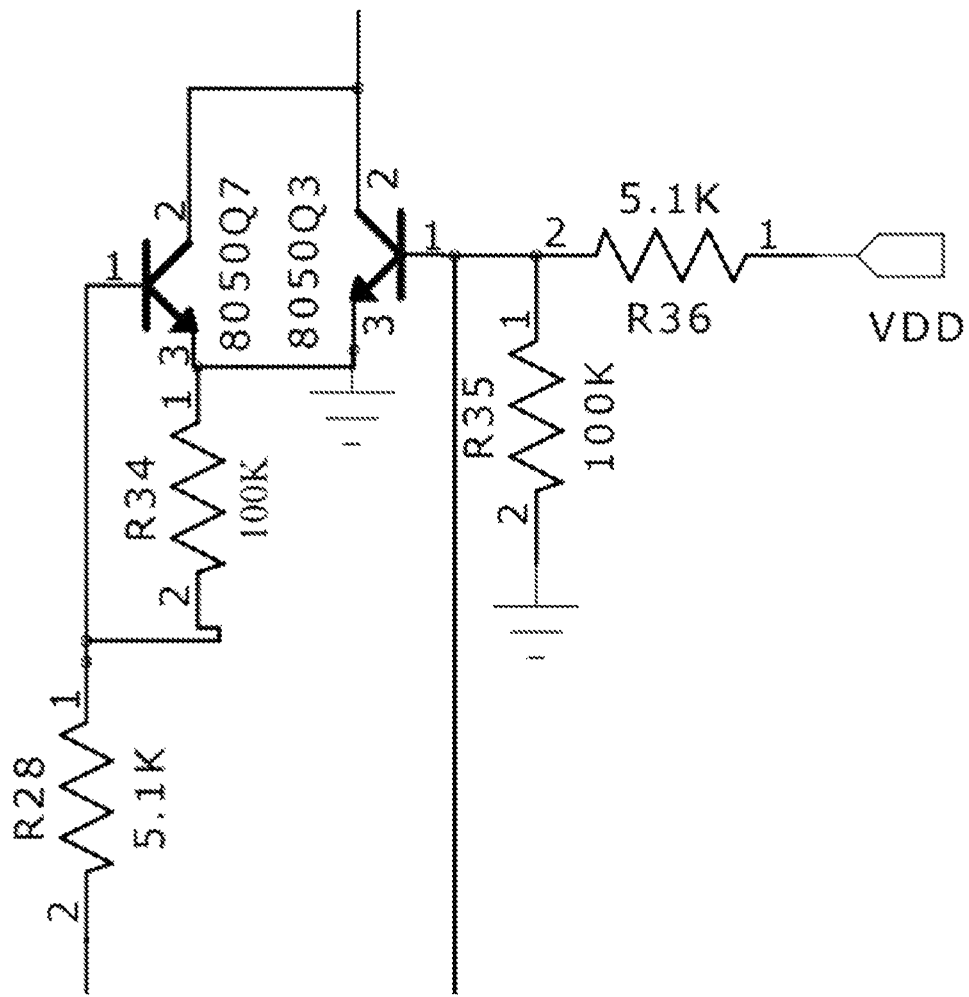
FIG. 5 is a schematic diagram of circuit connection of a control module of a safety control circuit and an automobile emergency starting clamp provided with the circuit according to the present disclosure.

Descriptions of elements in the drawings: 1: anode cable clamp; 2: cathode cable clamp; 30: control box; 301: control box upper shell; 302: control box lower shell; 303: on/off button; 31: EC5 input module; 32: ignition clip module; 321: first wire; 322: second wire; 323: third wire; 33: relay module; 34: timing control module; 35: input high-voltage protection module; 36: voltage-stabilizing power supply module; 37: input low-voltage protection module; 38: high-temperature protection module; 39: low-temperature protection module; 391: error alarm module; 41: first timing module; 411: forced power-on module; 42: second timing module; 43: light display module.

DETAILED DESCRIPTION OF THE EMBODIMENTS

The technical solutions in the embodiments of the present disclosure will be described clearly and completely below in combination with the accompanying drawings of the embodiments of the present disclosure. Apparently, the described embodiments are only part of the embodiments of the present disclosure, not all embodiments. All other embodiments obtained by those of ordinary skill in the art based on the embodiments in the present disclosure without creative work shall fall within the protection scope of the present disclosure.

Referring to FIGS. 1-17, in the embodiment of the present disclosure, a safety control circuit includes an EC5 input module 31, an ignition clip module 32, a relay module 33, a timing control module 34, an input high-voltage protection module 35, a voltage-stabilizing power supply module 36, an input low-voltage protection module 37, a high-temperature protection module 38, a low-temperature protection module 39, an error alarm module 391, a first timing module 41, a second timing module 42 and a light display module 43;

- the EC5 input module 31 includes an EC5+ terminal and an EC5− terminal;
- the ignition clip module 32 includes a red clip wire OUT+ network terminal, a black clip OUT− terminal, a diode D12 and a diode D19; the red clip wire OUT+ network terminal is connected to a first wire 321; the first wire 321 is connected to OUT+ and is connected to one end of the diode D19 and an output end of the relay module 33 at the same time; an input end of the relay module 33 is connected to a second wire 322; the other end of the second wire 322 is connected to the EC5+ terminal; the other end of the diode D19 is connected to a Negative Temperature Coefficient (NTC) resistor; the black clip OUT− terminal is connected to a third wire 323; the third wire 323 is connected to an OUT− network and is connected to one end of the diode D12 at the same time; the other end of the diode D12 is grounded; the other end of the third wire 323 is connected to the EC5− terminal;
- the EC5+ terminal is also connected to a VCC+ network, the voltage-stabilizing power supply module 36 and the input high-voltage protection module 35;
- the relay module 33 includes a relay RK3, a diode D6, a diode D7, a triode Q1, a resistor R7, a resistor R44, a triode Q2, and a resistor R4; while pin 3 of the relay RK3 is connected to the VCC+ network, after pin 3 is connected to the diode D6, the diode D7 and pin 2 of the triode Q1 in series, pin 1 of the triode Q1 is connected to pin 2 of the resistor R44; pin 3 of the triode Q1 is grounded; pin 1 of the resistor R7 is connected to pin 3 of the triode Q1; after pin 2 of the resistor R7 is connected to pin 2 of the triode Q2, pin 1 of the triode Q2 is connected to pin 2 of the resistor R4; pin 1 of the resistor R4 and pin 3 of the triode Q2 are grounded; pin 2 of the relay RK3 is set as an output end of the relay module 33; pin 1 of the relay RK3 is set as an input end of the relay module 33;
- the voltage-stabilizing power supply module 36 includes a diode D1, a capacitor C1, a capacitor C2, a three-terminal voltage-stabilizing chip U3, a capacitor C3, a capacitor C6, and a filter capacitor CE3; one end of the diode D1 is connected to the EC5+ terminal, and the other end is connected to a VIN terminal of the three-end voltage-stabilizing chip U3; the capacitor C1 and the capacitor C2 are connected in parallel to the VIN terminal and a GND terminal of the three-terminal voltage-stabilizing chip U3; the capacitor C3, the capacitor C6 and the filter capacitor CE3 are all connected in parallel to the GND terminal and an OUT terminal of the three-terminal voltage-stabilizing chip U3; the GND terminal of the three-terminal voltage-stabilizing chip U3 is grounded; one end of the capacitor C1 is connected to pin 3 of the three-terminal voltage-stabilizing chip U3, and the other end is connected to pin 2 of the three-terminal voltage-stabilizing chip U3; pin 3 of the three-terminal voltage-stabilizing chip U3 is also connected to a VCC1 power supply voltage;

the input high-voltage protection module 35 includes a zener diode ZD1, a zener diode ZD2, a diode D9, a diode D13, a resistor R13 and a resistor R21; the zener diode ZD2 is connected in series with the diode D9, the diode D13, the resistor R21, the diode D13 and the zener diode ZD1 in sequence, and the other end of the zener diode ZD1 is connected to the OUT+ network;

the input low-voltage protection module 37 includes a diode D5, a diode D4, a resistor R16, an output signal LV, an operational amplifier LM-358, a capacitor C4, a resistor R15, a capacitor C8, a capacitor C19, a capacitor C22, a capacitor C13, a capacitor C21, a resistor R24, a diode D11, the VCC1 power supply voltage, a diode D17, a resistor R26, a triode Q5, a resistor R33, a resistor R19, a capacitor C11, a resistor R8, a resistor R19 and a capacitor C5; the operational amplifier LM-358 includes a VDD terminal of pin 8, a + terminal of pin 5, a – terminal of pin 6, a U1-B terminal of pin 7 and a GND terminal of pin 4; the diode D5, the diode D4 and resistor R16 are connected in series in sequence; pin 7 of the operational amplifier LM-358 is connected to a control signal LV; the U1-B terminal of pin 7 and the + terminal of pin 5 of the operational amplifier LM-358 are respectively connected in parallel to two ends of the diode D4 and the resistor R16; the GND terminal of pin 4 of the operational amplifier LM-358 is grounded; the VDD terminal of pin 8 of the operational amplifier LM-358 is connected to the OUT terminal of pin 1 of the three-terminal voltage-stabilizing chip U3 in the voltage-stabilizing power supply module; the – terminal of pin 6 of the operational amplifier LM-358 is connected in series with the resistor R24, the diode D11 and the VCC1 power supply voltage in sequence; the resistor R15, the capacitor C8, the capacitor C19, the capacitor C22, the capacitor C13 and the capacitor C21 are all connected in parallel to the VVD terminal of pin 8 and the – terminal of pin 6 of the operational amplifier LM-358; the capacitor C4 and the resistor R15 are connected in series; the resistor R26 is connected in series with the diode D17, pin 2 of the triode Q5 and pin 3 of the triode Q5 in sequence and is then connected in parallel to pin 6 of the operational amplifier LM-358 and the VDD terminal of pin 8 of the operational amplifier LM-358; pin 1 of the triode Q5 is grounded after being connected to the resistor R19 and the capacitor C11; two ends 2 and 1 of the resistor R33 are respectively connected in parallel to pin 3 of the triode Q5 and end 1 of the resistor R19; after being connected in series, the capacitor C5 and the resistor R8 are respectively connected to end 2 of the resistor R16 and the OUT terminal of pin 1 in the three-terminal voltage-stabilizing chip U3 in the voltage-stabilizing power supply module; two ends of the resistor R9 are respectively connected to the capacitor C5 and end 1 of the resistor R8; end 1 of the resistor R9 is grounded after being connected to the capacitor C5;

the high-temperature protection module 36 includes a network OT, a diode D3, a diode D8, a temperature comparator U1-A, a resistor R18, an NTC resistor, a capacitor C10, a resistor R3, a capacitor C9, a resistor R10, a resistor R14 and a VDD power supply voltage; the diode D3 is connected to pin 1 of the temperature comparator U1-A; pin 2 of the temperature comparator U1-A is connected to the OUT terminal of pin 1 in the three-terminal voltage-stabilizing chip U3 in the voltage-stabilizing power supply module after being connected to the resistor R3; the network OT is connected in series to the diode D8 and the resistor R18 in sequence; the network OT and pin 2 of the resistor R18 are respectively connected to the diode D3 and pin 3 of the temperature comparator U1-A; pin 2 of the NTC resistor is grounded; pin 1 of the NTC resistor is connected to pin 1 of the resistor R3; the capacitor C10 is connected in parallel to two ends of pin 2 and pin 1 of the NTC resistor; pin 3 of the temperature comparator U1-A is connected in series to the resistor R14 and the VDD power supply voltage; pin 2 of the resistor R10 is grounded; pin 1 of the resistor R10 is connected to pin 1 of the resistor R14; the capacitor C9 is connected in parallel to two ends of pin 1 and pin 2 of the resistor R10;

the timing control module 34 includes a resistor R28, a resistor R34, a triode Q7, a triode Q3, a resistor R35 and a resistor R36; pin 2 of the triode Q3 is connected to pin 1 of the resistor R44 and pin 2 of the triode Q7; pin 1 of the triode Q3 is connected to pin 2 of the resistor R36 and pin 1 of the resistor R35; pin 1 of the resistor R36 is connected to a VDD network; pin 2 of the resistor R35 is grounded; pin 1 of the triode Q7 is connected to pin 1 of the resistor 28 and pin 2 of the resistor R34; pin 1 of the resistor R34 is connected to pin 3 of the triode Q7;

the first timing module 41 includes a PM single-pole power supply voltage, a resistor R31, a diode D18, a chip U2, a V1 single pole power supply voltage, a capacitor C14, a capacitor C16, a capacitor C17, a diode D14, a diode D15, a resistor R30, a resistor R32, a resistor R29, a photoelectric coupler PC1, a resistor R2, a diode D16, a resistor R38, a Metal Oxide Semiconductor (mos) transistor Q8 and a forced power-on module 411; the forced power-on module 411 includes a triode Q9, a resistor R39, a filter capacitor CE2, a resistor R40, and a button switch K1; pin 3 of the triode Q9 is grounded; pin 1 of the triode Q9 is connected to pin 1 of the resistor R39; pin 2 of the resistor R39 is connected to pin 1 of the resistor R40; pin 2 of the resistor R40 is connected to pin 2 of a button switch K1; pin 1 of the button switch K1 is connected to the VDD network; pin 1 of the filter capacitor CE2 is connected to pin 2 of the resistor R39 and pin 1 of the resistor R40; pin 2 of the filter capacitor CE2 is grounded; pin 1 of the resistor R31 is connected to pin 1 of the resistor R44 and the PM network; pin 2 of the resistor R31 is connected to pin 3 of the chip U2; the diode D18 is connected in parallel to the resistor R31; pin 5 of the chip U2 is grounded after being connected to the capacitor C14; pin 2 of the chip U2 is simultaneously connected to pin 6 of the chip U2, one end of the capacitor C17, one end of the diode D14 and one end of the diode D15; the other end of the capacitor C17 is grounded; the other end of the diode D15 is connected to pin 2 of the resistor R30; pin 1 of the resistor R30 is connected to pin 2 of the resistor R32; pin 1 of the resistor R32 is simultaneously connected to one end of the capacitor C16, pin 4 of the chip U2, pin 8 of the chip U2 and pin 3 of the mos transistor Q8; the other end of the capacitor C16 is grounded; pin 7 of the chip U2 is simultaneously connected to the other end of the diode D14, pin 1 of the resistor R30 and pin 2 of the resistor R32; pin 1 of the mos transistor Q8 is simultaneously connected to pin 4 of the photoelectric coupler PC1, pin 2 of the resistor R38 and pin 2 of the triode Q9 in the forced power-on module 411; pin 1 of the resistor R38 is connected to pin 2 of the mos transistor Q8 and the VDD network; pin 3 and pin 2 of the photoelectric coupler PC1 are respectively grounded; pin 1 of the photoelectric coupler PC1 is simultaneously connected to pin 2 of the resistor R29 and pin 1 of the resistor R2; pin 1 of the resistor R29 is grounded; pin 2 of the resistor R2 is connected to one end of the diode D16;

the low-temperature protection module 39 includes a resistor R11, a zener diode ZD3, a resistor R20, a photoelectric coupler PC3, an NTC network, a triode U4, a capacitor C7 and a resistor R45; pin 2 of the zener diode ZD3 is connected to the other end of the diode D16; pin 1 of the zener diode ZD3 is simultaneously connected to the OUT+ network and pin 1 of the resistor R20; pin 2 of the resistor R20 is connected to pin 2 of the photoelectric coupler PC3; pin 3 of the photoelectric coupler PC3 is grounded; pin 4 of the photoelectric coupler PC3 is connected to the NTC; pin 1 of the photoelectric coupler PC3 is connected to the OUT− network; pin 2 of the resistor R11 is connected to pin 1 of the resistor R4; pin 1 of the resistor R11 is grounded;

the second timing module 42 includes a capacitor C15, a resistor R22, a resistor R23, a triode Q32, a resistor R41, a V1 network, a diode D10, a filter capacitor CE1, a resistor R37, and a triode Q6; pin 3 of the triode Q32 is simultaneously connected to pin 1 of the resistor R41 and pin 2 of the resistor R22; pin 2 of the resistor R41 is connected to the V1 network; pin 1 of the resistor R22 is simultaneously connected to pin 1 of R23 and one end of the capacitor C15; the other end of the capacitor C15 is grounded; pin 2 of the triode Q32 is connected to one end of the diode D10; the other end of the diode D10 is simultaneously connected to pin 1 of the filter capacitor CE1 and pin 1 of the resistor R37; pin 2 of the filter capacitor CE1 is grounded; pin 2 of the resistor R37 is connected to pin 1 of the triode Q6; pin 3 of the triode Q6 is grounded; pin 2 of the triode Q6 is connected to pin 1 of the triode Q3;

the error alarm module 391 includes a resistor R17, a triode Q10, a diode D2, a resistor R5 and a buzzer; pin 1 of the resistor R17 is connected to pin 1 of the resistor R4; pin 2 of the resistor R17 is connected to pin 1 of the triode Q10; pin 3 of the triode Q10 is grounded; pin 2 of the triode Q10 is connected to pin 2 of the buzzer; two ends of the diode D2 are respectively connected to pin 1 and pin 2 of the buzzer; pin 2 of the resistor R5 is connected to pin 1 of the buzzer; pin 1 of the resistor R5 is connected to the VDD network;

the light display module 43 includes a resistor R42, a triode Q13, a capacitor C25, a triode Q14, a resistor R43, a resistor R6, a triode Q11, a resistor R12, a red light LED3, a capacitor C18, a resistor R27, a triode Q12, a resistor R1, a capacitor C23 and a green light LED1; pin 1 of the resistor R42 is connected to pin 1 of the resistor R4; pin 2 of the resistor R42 is connected to pin 1 of the triode Q13; pin 3 of the triode Q13 is grounded; pin 2 of the triode Q13 is simultaneously connected to pin 1 of the triode Q12, pin 2 of the resistor R27 and one end of the capacitor C18; pin 3 of the triode Q12 is connected to pin 3 of the triode Q11 and grounded; pin 2 of the triode Q12 is simultaneously connected to pin 2 of the resistor R1 and one end of the capacitor C23; the other end of C23 is simultaneously connected to pin 2 of the triode Q14, pin 1 of the triode Q11 and pin 2 of the resistor R6; pin 2 of the triode Q11 is simultaneously connected to the other end of the capacitor C18 and pin 1 of the resistor R12; pin 2 of the resistor R12 is connected to one end of the red light LED3; pin 1 of the resistor R1 is connected to one end of the green light LED1; pin 1 of the resistor R6 is connected to VDD after being connected to the other end of the red light LED3, pin 1 of the resistor R27 and the other end of the green light LED1; pin 3 of the triode Q14 is grounded and is connected to one end of the capacitor C25 at the same time; the other end of the capacitor C25 is simultaneously connected to pin 1 of the triode Q14 and pin 2 of the resistor R43; and pin 1 of the resistor R43 is connected to the PM network.

Preferably, in the above-mentioned safety control circuit, the model number of the three-terminal voltage-stabilizing chip U3 is 78L05.

Preferably, in the above-mentioned safety control circuit, the model number of the D9 and the D3 is 1N4148.

Preferably, in the above-mentioned safety control circuit, a resistance value of the resistor R15 is set to be 200 K.

Preferably, in the above-mentioned safety control circuit, the model number of the triode Q6 is 8050.

Preferably, in the above-mentioned safety control circuit, the model number of the diode D18 is IN5189.

Preferably, in the above-mentioned safety control circuit, the model number of the mos transistor Q8 is 2301.

Preferably, in the above-mentioned safety control circuit, the model number of the buzzer is 5V/D1295.

The present disclosure further provides an automobile emergency starting clamp which is cooperatively used with an automobile emergency power supply. The automobile emergency starting clamp includes an anode cable clamp 1 provided with a red clip wire OUT+ terminal; a cathode cable clamp 2 provided with a black clip OUT− terminal; and a control box 30. The control box 30 includes a control box upper shell 301, a control box lower shell 302, an on/off button 303 and the above-mentioned safety control circuit.

Preferably, in the above-mentioned automobile emergency starting clamp, the control box upper shell 301 and the control box lower shell 302 are located above and below and are fixedly connected to each other; the safety control circuit is arranged between the control box upper shell 301 and the control box lower shell 302; and the on/off button 303 is arranged on one side of the control box upper shell 301 and is in contact connection with the button switch K1 of the safety control circuit.

Embodiment 1

Figure 6:
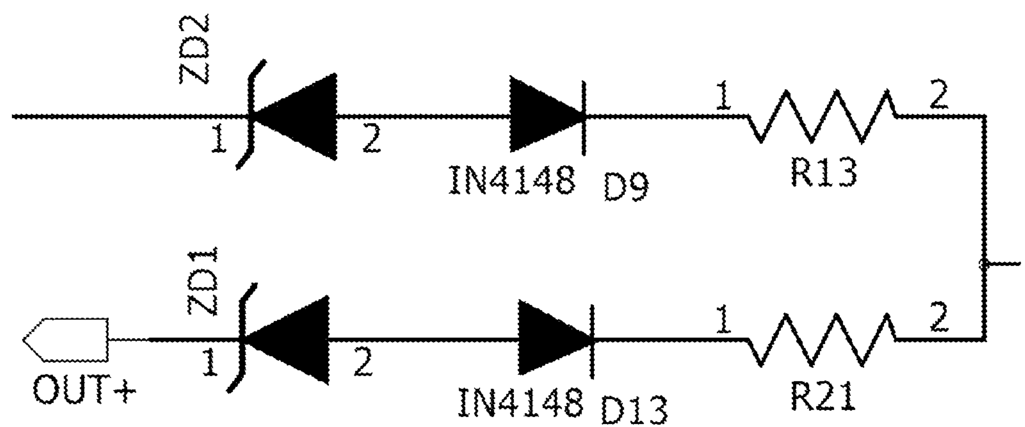
FIG. 6 is a schematic diagram of circuit connection of a high-voltage protection module of a safety control circuit and an automobile emergency starting clamp provided with the circuit according to the present disclosure.

Referring to FIG. 1 and FIG. 6, input/output overvoltage protection: the EC5 input module is connected to four batteries or voltages connected in series; and at 17.5 V to 19.2 V, the buzzer buzzes without stop, and a red light is on all the time.

Embodiment 2

Figure 8:
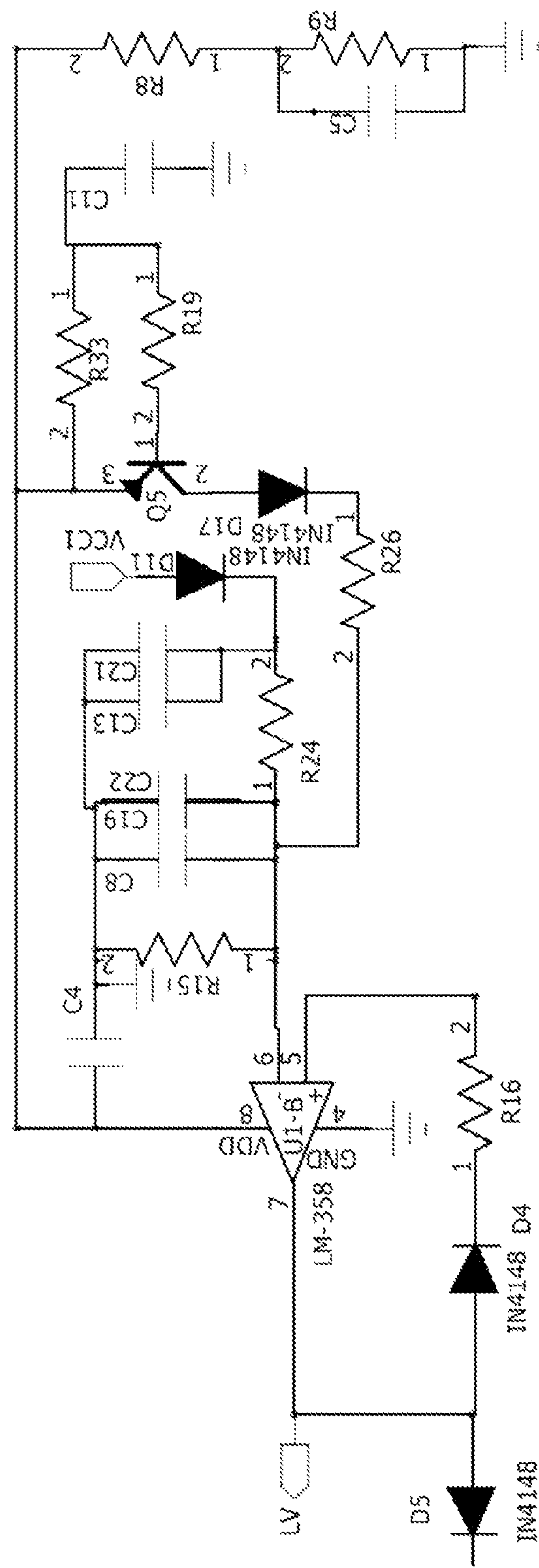
FIG. 8 is a schematic diagram of circuit connection of a low-voltage protection module of a safety control circuit and an automobile emergency starting clamp provided with the circuit according to the present disclosure.

Referring to FIG. 1 and FIG. 8, ultra-low protection voltage for an input voltage: the EC5 input module is connected to four batteries or input voltages connected in series, and a voltage is less than a set voltage value of 13.8 V, wherein the voltage value of 13.8 V is an adjustable value.

Embodiment 3

Referring to FIG. 1, input undervoltage waiting and protection time: a voltage connected to the EC5 input module is less than a set voltage value; the set voltage value is an adjustable value; the buzzer buzzes without stop, and red and blue lights are on all the time.

Embodiment 4

Referring to FIG. 1, automatic voltage identification for four batteries connected in series: the EC5 input module is connected to a battery or an input voltage for automatic identification.

Embodiment 5

Referring to FIG. 1, identification of a starting load voltage: the EC5 input module is connected to a battery; the anode cable clamp 1 and the cathode cable clamp 2 are connected to a storage battery; when the voltage of the storage battery is between 3 V and 17 V, the relay is closed, and the green light is normally on; and when the voltage of the storage battery is not within this range, the red light and the green light alternately flash for a long time, and the relay is not closed.

Embodiment 6

Figure 9:
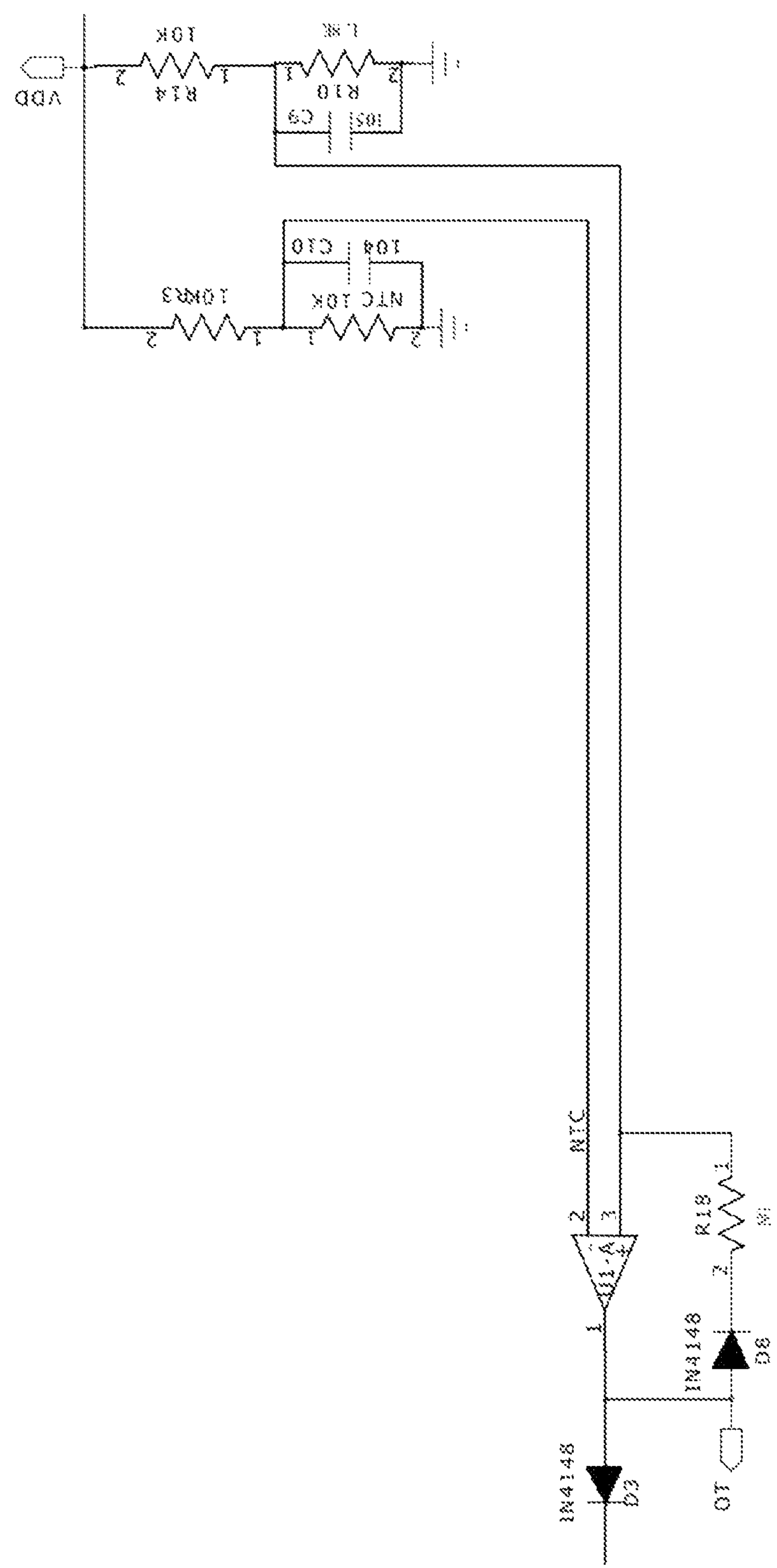
FIG. 9 is a schematic diagram of circuit connection of a high-temperature protection module of a safety control circuit and an automobile emergency starting clamp provided with the circuit according to the present disclosure.
Figure 10:
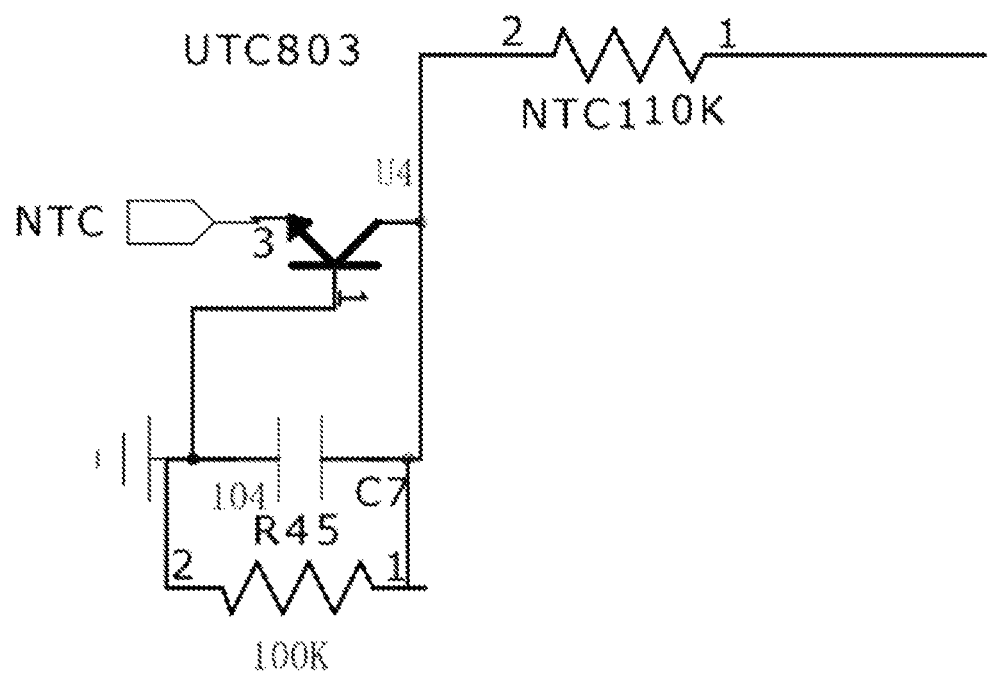
FIG. 10 is a schematic diagram of circuit connection of a low-temperature protection module of a safety control circuit and an automobile emergency starting clamp provided with the circuit according to the present disclosure.
Figure 11:
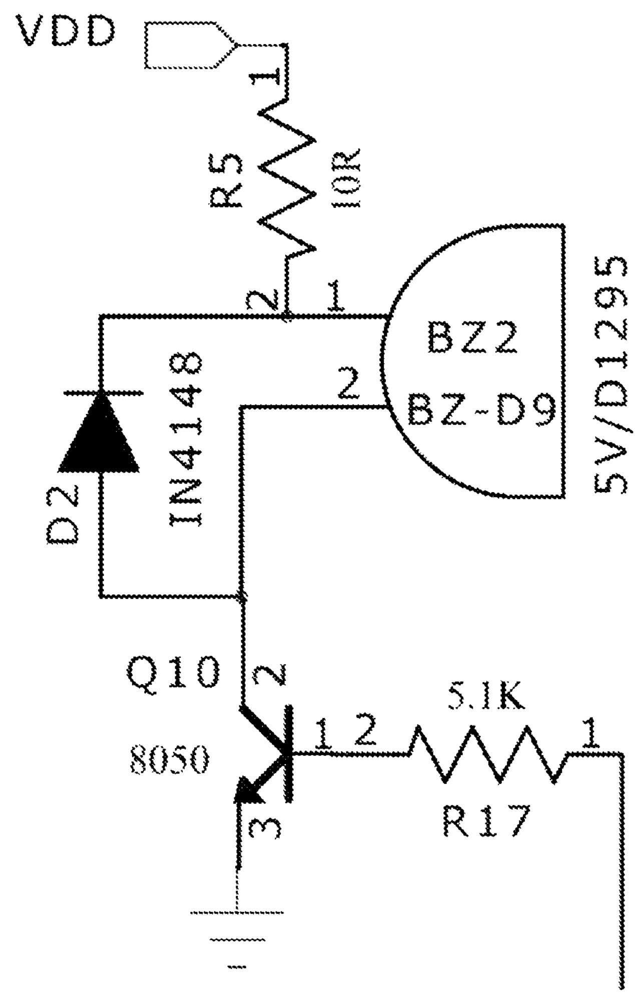
FIG. 11 is a schematic diagram of circuit connection of an error alarm module of a safety control circuit and an automobile emergency starting clamp provided with the circuit according to the present disclosure.
Figure 12:
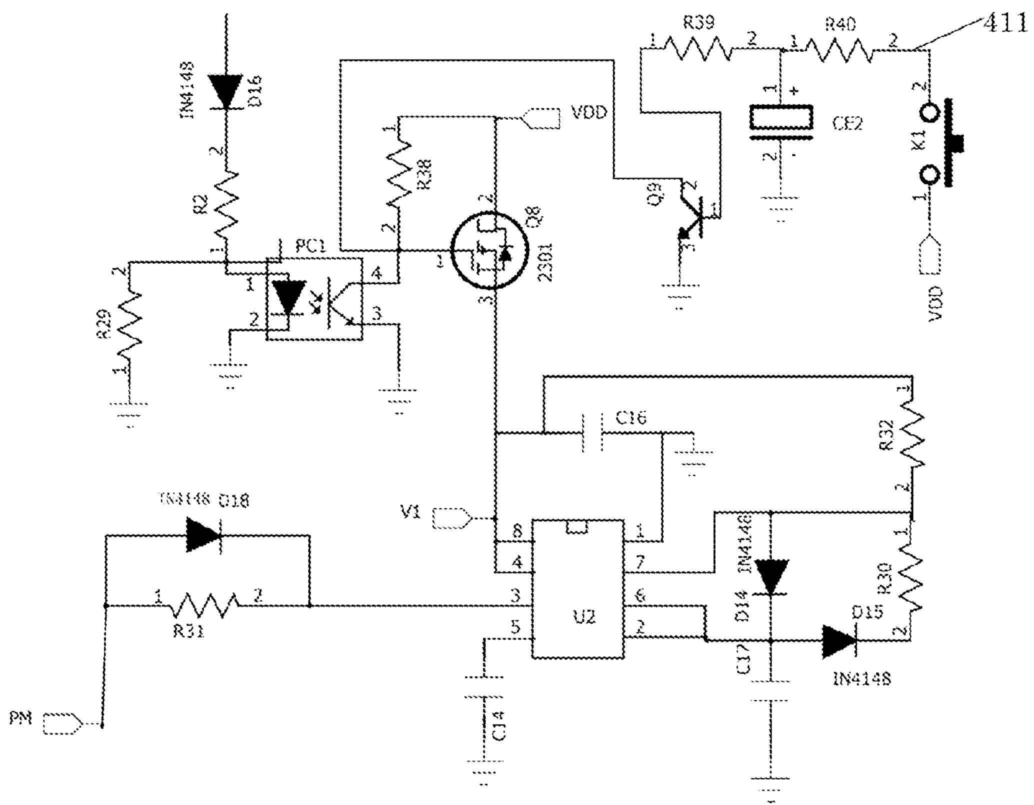
FIG. 12 is a schematic diagram of circuit connection of a first timing module of a safety control circuit and an automobile emergency starting clamp provided with the circuit according to the present disclosure.
Figure 13:
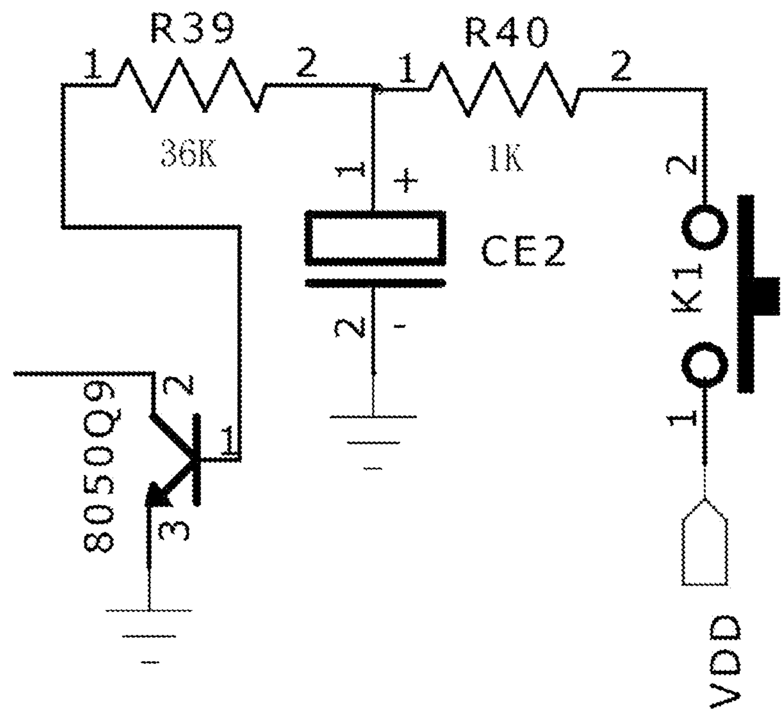
FIG. 13 is a schematic diagram of circuit connection of a forced power-on module of a safety control circuit and an automobile emergency starting clamp provided with the circuit according to the present disclosure.
Figure 14:
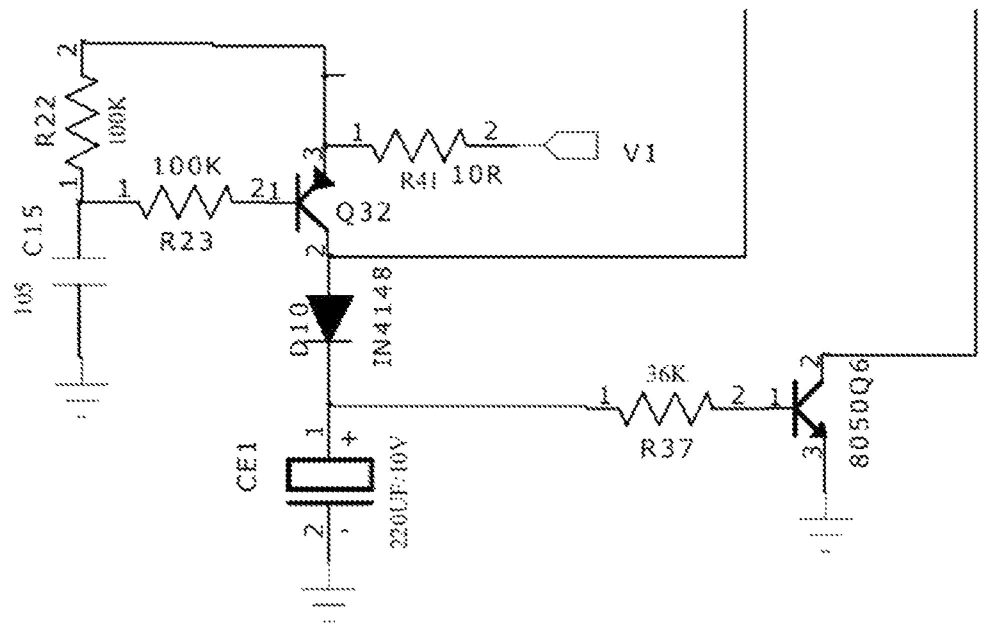
FIG. 14 is a schematic diagram of circuit connection of a second timing module of a safety control circuit and an automobile emergency starting clamp provided with the circuit according to the present disclosure.
Figure 15:
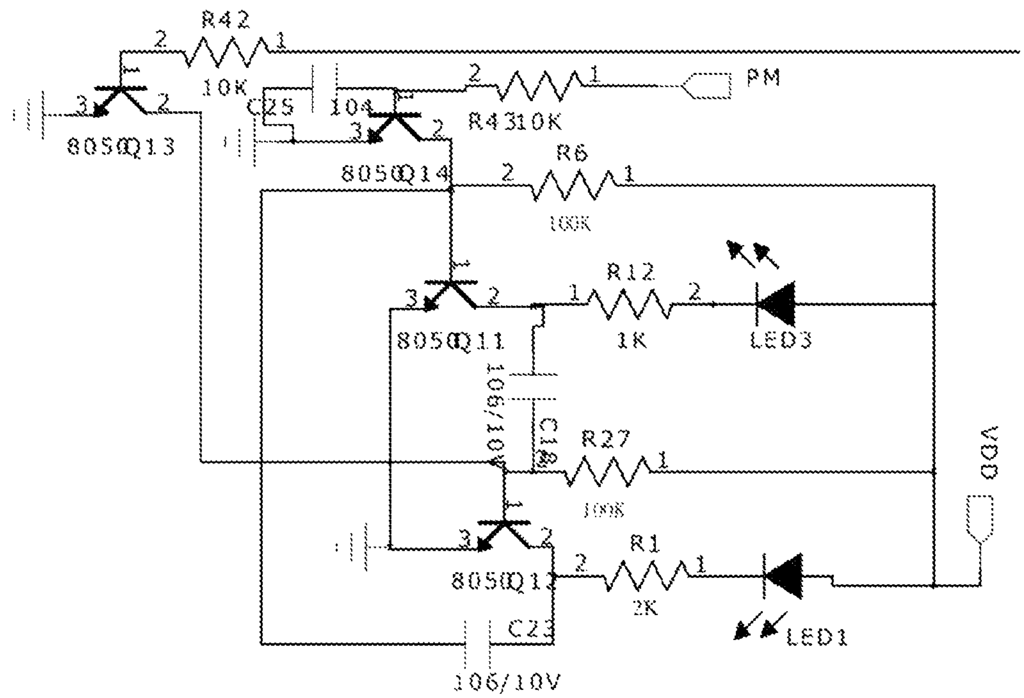
FIG. 15 is a schematic diagram of circuit connection of a light display module of a safety control circuit and an automobile emergency starting clamp provided with the circuit according to the present disclosure.
Figure 16:
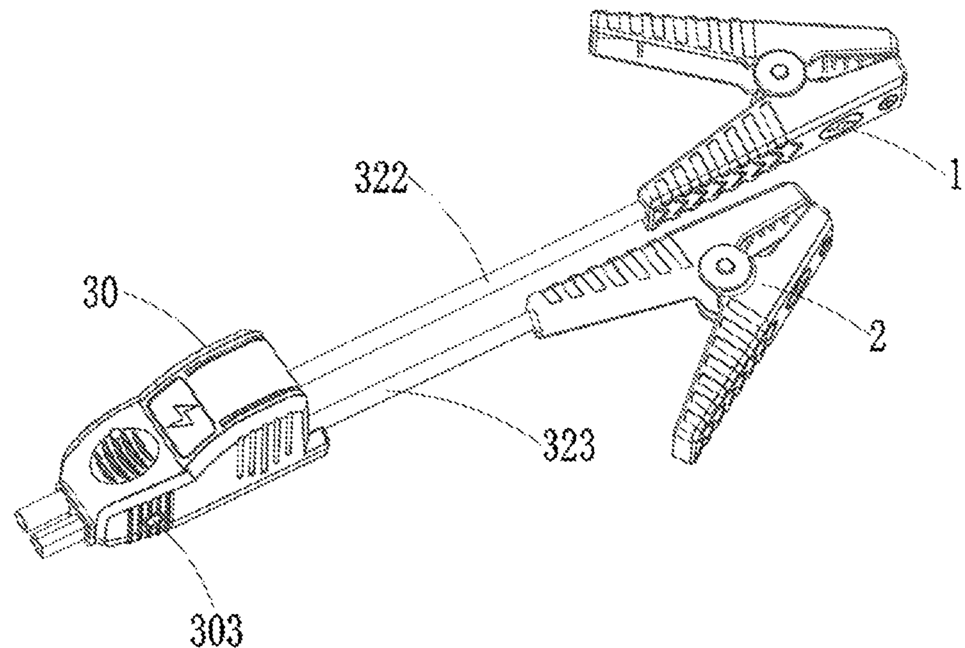
FIG. 16 is a schematic diagram of a three-dimensional structure of an automobile emergency starting clamp of a safety control circuit and an automobile emergency starting clamp provided with the circuit according to the present disclosure.
Figure 17:
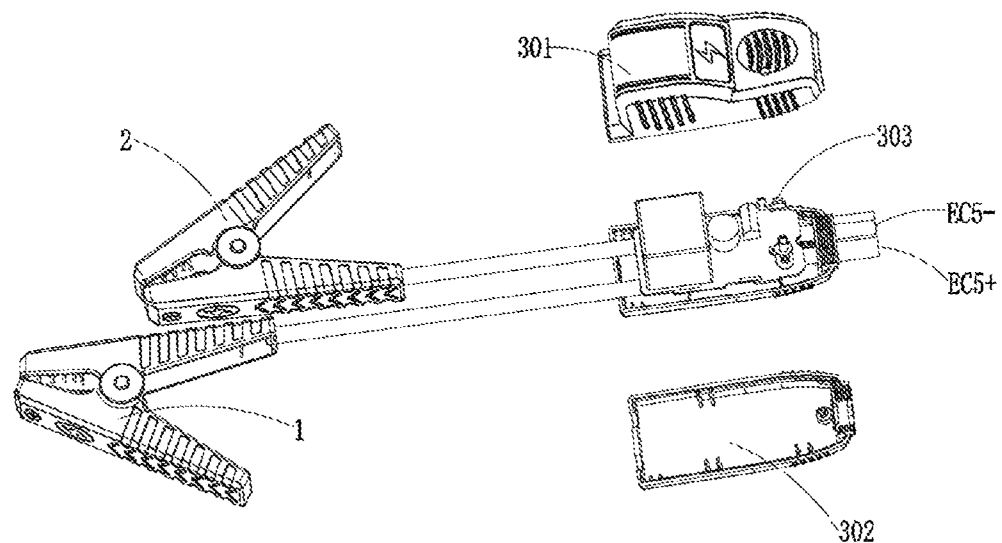
FIG. 17 is an exploded diagram of an automobile emergency starting clamp of a safety control circuit and an automobile emergency starting clamp provided with the circuit according to the present disclosure.

Referring to FIG. 1 and FIG. 9, a high-temperature protection temperature: when the anode cable clamp 1 and the cathode cable clamp 2 work in a high-power or special environment, if a temperature in the control box 30 rises to 86-92° C.+/−10%, the red light is on all the time, and the buzzer buzzes without stop.

Embodiment 7

Referring to FIG. 1 and FIG. 9, an automatic cancellation temperature for temperature protection: in a high-temperature protection state, if the temperature in the control box 30 drops to 86° C. or below, the EC5 input module is unplugged manually, and the high-temperature protection state can be canceled.

Embodiment 8

Referring to FIG. 1 and FIG. 9, an automatic cancellation method for temperature protection: the anode cable clamp 1 and the cathode cable clamp 2 are in a high-temperature protection state, the temperature in the control box 30 is controlled to drop to a high-temperature protection temperature; and the temperature protection is canceled after the control box is powered on again.

Embodiment 9

Referring to FIG. 1, a peak current: a peak current that passes through the anode cable clamp 1 and the cathode cable clamp 2 in an ignition state is simulated to be 800 A/200 mS.

Embodiment 10

Referring to FIG. 1, no-load waiting for protection: the EC5 input module is connected to a battery; the anode cable clamp 1 and the negative cable clamp 2 are not connected to the storage battery; the red light and the green light continuously alternately flash, and the buzzer does not buzz and is continuously in a waiting state.

Embodiment 11

Referring to FIG. 1, mounting waiting timeout protection: the EC5 input module is connected to the battery; the anode cable clamp 1 and the cathode cable clamp 2 are connected to the storage battery; an automobile does not start; as a result, after 30 S, the relay stops being closed; and the red light and the green light alternately flash, and the buzzer does not buzz.

Embodiment 12

Referring to FIG. 1, short circuit protection: after the EC5 input module is connected to the battery, the anode cable clamp 1 and the cathode cable clamp 2 are short-circuited; there is no spark, and no components are broken; the red light is on all the time; and the buzzer buzzes without stop.

Embodiment 13

Referring to FIG. 1, cancellation of output short circuit protection: the EC5 input module is kept being connected to the battery, and contact short circuit of the anode cable clamp 1 and the cathode cable clamp 2 is canceled; and the red light and the green light continuously alternately flash.

Embodiment 14

Referring to FIG. 1, the clamp is first connected to the storage battery for protection: the anode cable clamp 1 and the cathode cable clamp 2 are connected to the storage battery, and the EC5 input module is not powered on; and the relay is not closed.

Embodiment 15

Referring to FIG. 1, the anode cable clamp 1 and the cathode cable clamp 2 are first connected to the storage battery, and the EC5 input module is then powered on: the anode cable clamp 1 and the cathode cable clamp 2 are first connected to the automobile storage battery, and the EC5 input module is then connected to a starting power supply; the green light is on all the time; and the relay is kept being closed.

Embodiment 16

Referring to FIG. 1, the EC5 input module is first connected, and the storage battery is then connected: the EC5 input module is connected to a starting power supply that is greater than or equal to 14.2 V and less than or equal to 17.5 V; the anode cable clamp 1 and the cathode cable clamp 2 are then connected to the automobile storage battery; and the relay starts to be closed.

Embodiment 17

Referring to FIG. 1, identification voltage for reverse connection of the storage battery: the EC5 input module is first connected to the battery, and the anode cable clamp 1 and the cathode cable clamp are then connected to the storage battery; and the starting clamp sounds an alarm if there is reverse connection.

Embodiment 18

Referring to FIG. 1, protection for reverse connection of the storage battery: the anode cable clamp 1 and the cathode cable clamp 2 are reversely connected to an anode and a cathode of the storage battery, and the relay is not closed.

Embodiment 19

Referring to FIG. 1, alarming for reverse connection of the storage battery: the EC5 input module is not connected to the battery; the anode cable clamp 1 and the cathode cable clamp 2 are reversely connected to an anode and a cathode of the storage battery; no light is on; and the buzzer does not buzz.

Embodiment 20

Figure 7:
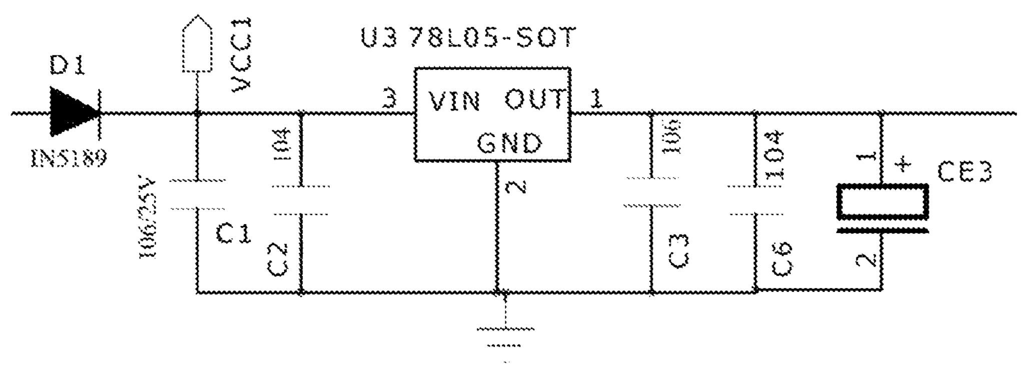
FIG. 7 is a schematic diagram of circuit connection of a voltage-stabilizing power supply module of a safety control circuit and an automobile emergency starting clamp provided with the circuit according to the present disclosure.

Referring to FIG. 1 and FIG. 7, alarming for reverse connection of the storage battery: the EC5 input module is connected to the battery; the anode cable clamp 1 and the cathode cable clamp 2 are reversely connected to an anode and a cathode of the storage battery; the red light is on all the time; and the buzzer buzzes without stop.

Embodiment 21

Referring to FIG. 1 and FIG. 7, input overvoltage protection and alarming: when a voltage of the EC5 input module is greater than or equal to 18.5 V, the red light is on all the time, and the buzzer buzzes without stop.

Embodiment 22

Referring to FIG. 1 and FIG. 7, cancellation of input overvoltage protection: an input voltage of the EC5 input module gradually decreases to a voltage satisfying high-voltage protection, and the input overvoltage protection is canceled.

Embodiment 23

Referring to FIG. 1 and FIG. 7, input undervoltage protection and alarming: when a voltage of the EC5 input module is less than 13 V, the red light is on all the time, and the buzzer buzzes without stop.

Embodiment 24

Referring to FIG. 1 and FIG. 7, cancellation of input undervoltage protection: an input voltage of the EC5 input module gradually increases to an input undervoltage protection cancellation voltage, and the EC5 input module is unplugged manually to cancel the input undervoltage protection.

Embodiment 25

Referring to FIG. 1, clamp looseness protection state: the EC5 input module is connected to the battery; the anode cable clamp 1 and the cathode cable clamp 2 are connected to the storage battery; and if a certain clamp or the two clamps are separated from the storage battery, the relay is opened; and the red light and the green light alternately flash, and the buzzer does not buzz.

Embodiment 26

Referring to FIG. 1, a period for waiting for protection after a clamp is loosened: the EC5 input module is connected to the battery; the clamp at the output end is connected to the storage battery; and if a certain clamp or the two clamps are separated from the storage battery, the period for waiting for protection is 3-5 S.

Embodiment 27

Referring to FIG. 1, clamp looseness short circuit: the EC5 input module is connected to the battery; the clamp at the output end is not connected to the storage battery; the anode cable clamp 1 and the cathode cable clamp 2 are made to be short-circuited; if explosive sparks appear, the red light is on all the time, and the buzzer buzzes without stop.

Embodiment 28

Referring to FIG. 1, connection of the clamp terminals to an overvoltage protection voltage: if the anode cable clamp 1 and the cathode cable clamp 2 are connected to a voltage greater than 18.7 V, the red light is on all the time, and the buzzer buzzes without stop.

Embodiment 29

Referring to FIG. 1, overvoltage protection state of the clamp terminals: if the anode cable clamp 1 and the cathode cable clamp 2 are connected to a voltage greater than a normal voltage of the battery, the red light is on all the time, and the buzzer buzzes without stop.

Embodiment 30

Referring to FIG. 1, cancellation of overvoltage protection of the clamp terminals: if two ends of the EC5 input module are connected to a voltage greater than a normal voltage of the battery, the EC5 input module is not powered on and is unplugged manually to cancel the overvoltage protection.

Embodiment 31

Starting rate: the anode cable clamp 1 and the cathode cable clamp 2 are connected to an automobile motor with power of 5.8 KW. If starting is completed for 10 times, the starting rate is 100%.

Embodiment 32

Starting rate of a real vehicle: the displacement of a starting machine is less than or equal to 2.6 ML. If starting is completed for 3 times, the starting rate is 100%.

Embodiment 33

Starting rate of a real vehicle: the rated power of an automobile engine is 80 KW. If starting is completed for 3 times, the starting rate is greater than or equal to 60%.

Embodiment 34

Operation of a forced starting button: the on/off button 303 is pressed o close the button switch K1, thus realizing a forced starting function. The operation is convenient, and fast response is achieved.

The above detailed description is a specific description of one of the possible embodiments of the present disclosure. This embodiment is not intended to limit the patent scope of the present disclosure. Any equivalent implementation or modification that does not deviate from the technical spirit of the present disclosure shall fall within the patent scope of this solution.

What is claimed is:

1. A safety control circuit, comprising an EC5 input module (31), an ignition clip module (32), a relay module (33), a timing control module (34), an input high-voltage protection module (35), a voltage-stabilizing power supply module (36), an input low-voltage protection module (37), a high-temperature protection module (38), a low-temperature protection module (39), an error alarm module (391), a first timing module (41), a second timing module (42) and a light display module (43);

wherein the EC5 input module (31) comprises an EC5+ terminal and an EC5− terminal;

the ignition clip module (32) comprises a red clip wire OUT+ network terminal, a black clip OUT− terminal, a diode D12 and a diode D19; the red clip wire OUT+ network terminal is connected to a first wire (321); the first wire (321) is connected to OUT+ and is connected to one end of the diode D19 and an output end of the relay module (33) at the same time; an input end of the relay module (33) is connected to a second wire (322); the other end of the second wire (322) is connected to the EC5+ terminal; the other end of the diode D19 is connected to a Negative Temperature Coefficient (NTC) resistor; the black clip OUT− terminal is connected to a third wire (323); the third wire (323) is connected to an OUT− network and is connected to one end of the diode D12 at the same time; the other end of the diode D12 is grounded; the other end of the third wire (323) is connected to the EC5− terminal;

the EC5+ terminal is also connected to a VCC+ network, the voltage-stabilizing power supply module (36) and the input high-voltage protection module (35);

the relay module (33) comprises a relay RK3, a diode D6, a diode D7, a triode Q1, a resistor R7, a resistor R44, a triode Q2, and a resistor R4; pin 3 of the relay RK3 is connected to the VCC+ network, and is connected to the diode D6, the diode D7 and pin 2 of the triode Q1 in sequence, pin 1 of the triode Q1 is connected to pin 2 of the resistor R44; pin 3 of the triode Q1 is grounded; pin 1 of the resistor R7 is connected to pin 3 of the triode Q1; pin 2 of the resistor R7 is connected to pin 2 of the triode Q2, pin 1 of the triode Q2 is connected to pin 2 of the resistor R4; pin 1 of the resistor R4 and pin 3 of the triode Q2 are grounded; pin 2 of the relay RK3 is set as an output end of the relay module (33); pin 1 of the relay RK3 is set as an input end of the relay module (33);

the voltage-stabilizing power supply module (36) comprises a diode D1, a capacitor C1, a capacitor C2, a three-terminal voltage-stabilizing chip U3, a capacitor C3, a capacitor C6, and a filter capacitor CE3; one end of the diode D1 is connected to the EC5+ terminal, and the other end is connected to a VIN terminal of the three-end voltage-stabilizing chip U3; the capacitor C1 and the capacitor C2 are connected in parallel to the VIN terminal and a GND terminal of the three-terminal voltage-stabilizing chip U3; the capacitor C3, the capacitor C6 and the filter capacitor CE3 are all connected in parallel to the GND terminal and an OUT terminal of the three-terminal voltage-stabilizing chip U3; the GND terminal of the three-terminal voltage-stabilizing chip U3 is grounded; one end of the capacitor C1 is connected to pin 3 of the three-terminal voltage-stabilizing chip U3, and the other end is connected to pin 2 of the three-terminal voltage-stabilizing chip U3; pin 3 of the three-terminal voltage-stabilizing chip U3 is also connected to a VCC1 power supply voltage;

the input high-voltage protection module (35) comprises a zener diode ZD1, a zener diode ZD2, a diode D9, a diode D13, a resistor R13 and a resistor R21; the zener diode ZD2 is connected in series with the diode D9, the resistor R13, the resistor R21, the diode D13 and the zener diode ZD1 in sequence, and an other end of the zener diode ZD1 is connected to the OUT+ network;

the input low-voltage protection module (37) comprises a diode D5, a diode D4, a resistor R16, an output signal LV, an operational amplifier LM-358, a capacitor C4, a resistor R15, a capacitor C8, a capacitor C19, a capacitor C22, a capacitor C13, a capacitor C21, a resistor R24, a diode D11 the VCC1 power supply voltage, a diode D17, a resistor R26, a triode Q5, a resistor R33, a resistor R19, a capacitor C11, a resistor R8, a resistor R19 and a capacitor C5; the operational amplifier LM-358 comprises a VDD terminal of pin 8, a + terminal of pin 5, a − terminal of pin 6, a U1-B terminal of pin 7 and a GND terminal of pin 4; the diode D5, the diode D4 and resistor R16 are connected in series in sequence; pin 7 of the operational amplifier LM-358 is connected to a control signal LV; the U1-B terminal of pin 7 and the + terminal of pin 5 of the operational amplifier LM-358 are respectively connected to the diode D4 and the resistor R16; the GND terminal of pin 4 of the operational amplifier LM-358 is grounded; the VDD terminal of pin 8 of the operational amplifier LM-358 is connected to the OUT terminal of pin 1 of the three-terminal voltage-stabilizing chip U3 in the voltage-stabilizing power supply module (36); the − terminal of pin 6 of the operational amplifier LM-358 is connected in series with the resistor R24, the diode D11 and the VCCC1 power supply voltage in sequence; the resistor R15, the capacitor C8, the capacitor C19, the capacitor C22, the capacitor C13 and the capacitor C21 are all connected in parallel to the VDD terminal of pin 8 and the − terminal of pin 6 of the operational amplifier LM-358; the capacitor C4 and the resistor R15 are connected in sequence; the resistor R26 is connected in series with the diode D17, pin 2 of the triode Q5 and pin 3 of the triode Q5 in sequence and between pin 6 of the operational amplifier LM-358 and the VDD terminal of pin 8 of the operational amplifier LM-358; pin 1 of the triode Q5 is grounded after being connected in series to the resistor R19 and the capacitor C11; two ends 2 and 1 of the resistor R33 are respectively connected to pin 3 of the triode Q5 and end 1 of the resistor R19; the resistor R8 is connected between end 2 of the resistor R16 and the OUT terminal of pin 1 in the three-terminal voltage-stabilizing chip U3 in the voltage-stabilizing power supply module (36); two ends of the resistor R9 are respectively connected to the capacitor C5 and end 1 of the resistor R8; end 1 of the resistor R9 is grounded after being connected to the capacitor C5;

the high-temperature protection module (36) comprises a network OT, a diode D3, a diode D8, a temperature comparator U1-A, a resistor R18, an NTC resistor, a capacitor C10, a resistor R3, a capacitor C9, a resistor R10, a resistor R14 and a VDD power supply voltage; the diode D3 is connected to pin 1 of the temperature comparator U1-A; pin 2 of the temperature comparator U1-A is connected to the OUT terminal of pin 1 in the three-terminal voltage-stabilizing chip U3 in the voltage-stabilizing power supply module (36) by way of connection to the resistor R3; the network OT is connected in series to the diode D8 and the resistor R18 in sequence; the network OT and pin 2 of the resistor R18 are respectively connected to the diode D3 and pin 3 of the temperature comparator U1-A; pin 2 of the NTC resistor is grounded; pin 1 of the NTC resistor is connected to pin 1 of the resistor R3; the capacitor C10 is connected in parallel to the NTC resistor; pin 3 of the temperature comparator U1-A is connected in series to the resistor R14 and the VDD power supply voltage; pin 2 of the resistor R10 is grounded; pin 1 of the resistor R10 is connected to pin 1 of the resistor R14; the capacitor C9 is connected in parallel to the resistor R10;

the timing control module (34) comprises a resistor R28, a resistor R34, a triode Q7, a triode Q3, a resistor R35 and a resistor R36; pin 2 of the triode Q3 is connected to pin 1 of the resistor R44 and pin 2 of the triode Q7; pin 1 of the triode Q3 is connected to pin 2 of the resistor R36 and pin 1 of the resistor R35; pin 1 of the resistor R36 is connected to a VDD network; pin 2 of the resistor R35 is grounded; pin 1 of the triode Q7 is connected to pin 1 of the resistor 28 and pin 2 of the resistor R34; pin 1 of the resistor R34 is connected to pin 3 of the triode Q7;

the first timing module (41) comprises a PM network, a resistor R31, a diode D18, a chip U2, a V1 network, a capacitor C14, a capacitor C16, a capacitor C17, a diode D14, a diode D15, a resistor R30, a resistor R32, a resistor R29, a photoelectric coupler PC1, a resistor R2, a diode D16, a resistor R38, a Metal Oxide Semiconductor (MOS) transistor Q8 and a forced power-on module (411); the forced power-on module (411) comprises a triode Q9, a resistor R39, a filter capacitor CE2, a resistor R40, and a button switch K1; pin 3 of the triode Q9 is grounded; pin 1 of the triode Q9 is connected to pin 1 of the resistor R39; pin 2 of the resistor R39 is connected to pin 1 of the resistor R40; pin 2 of the resistor R40 is connected to pin 2 of a button switch K1; pin 1 of the button switch K1 is connected to the VDD network; pin 1 of the filter capacitor CE2 is connected to pin 2 of the resistor R39 and pin 1 of the resistor R40; pin 2 of the filter capacitor CE2 is grounded; pin 1 of the resistor R31 is connected to pin 1 of the resistor R44 and the PM network; pin 2 of the resistor R31 is connected to pin 3 of the chip U2; the diode D18 is connected in parallel to the resistor R31; pin 5 of the chip U2 is grounded by way of connection to the capacitor C14; pin 2 of the chip U2 is simultaneously connected to pin 6 of the chip U2, one end of the capacitor C17, one end of the diode D14 and one end of the diode D15; the other end of the capacitor C17 is grounded; the other end of the diode D15 is connected to pin 2 of the resistor R30; pin 1 of the resistor R30 is connected to pin 2 of the resistor R32; pin 1 of the resistor R32 is simultaneously connected to one end of the capacitor C16, pin 4 of the chip U2, pin 8 of the chip U2 and pin 3 of the MOS transistor Q8; the other end of the capacitor C16 is grounded; pin 7 of the chip U2 is simultaneously connected to the other end of the diode D14, pin 1 of the resistor R30 and pin 2 of the resistor R32; pin 1 of the MOS transistor Q8 is simultaneously connected to pin 4 of the photoelectric coupler PC1, pin 2 of the resistor R38 and pin 2 of the triode Q9 in the forced power-on module (411); pin 1 of the resistor R38 is connected to pin 2 of the MOS transistor Q8 and the VDD network; pin 3 and pin 2 of the photoelectric coupler PC1 are respectively grounded; pin 1 of the photoelectric coupler PC1 is simultaneously connected to pin 2 of the resistor R29 and pin 1 of the resistor R2; pin 1 of the resistor R29 is grounded; pin 2 of the resistor R2 is connected to one end of the diode D16;

the low-temperature protection module (39) comprises a resistor R11, a zener diode ZD3, a resistor R20, a photoelectric coupler PC3, an NTC network, a triode U4, a capacitor C7 and a resistor R45; pin 2 of the zener diode ZD3 is connected to the other end of the diode D16; pin 1 of the zener diode ZD3 is simultaneously connected to the OUT+ network and pin 1 of the resistor R20; pin 2 of the resistor R20 is connected to pin 2 of the photoelectric coupler PC3; pin 3 of the photoelectric coupler PC3 is grounded; pin 4 of the photoelectric coupler PC3 is connected to the NTC network; pin 1 of the photoelectric coupler PC3 is connected to the OUT− network; pin 2 of the resistor R11 is connected to pin 1 of the resistor R4; pin 1 of the resistor R11 is grounded;

the second timing module (42) comprises a capacitor C15, a resistor R22, a resistor R23, a triode Q32, a resistor R41, a V1 network, a diode D10, a filter capacitor CE1, a resistor R37, and a triode Q6; pin 3 of the triode Q32 is simultaneously connected to pin 1 of the resistor R41 and pin 2 of the resistor R22; pin 2 of the resistor R41 is connected to the V1 network; pin 1 of the resistor R22 is simultaneously connected to pin 1 of R23 and one end of the capacitor C15; the other end of the capacitor C15 is grounded; pin 2 of the triode Q32 is connected to one end of the diode D10; the other end of the diode D10 is simultaneously connected to pin 1 of the filter capacitor CE1 and pin 1 of the resistor R37; pin 2 of the filter capacitor CE1 is grounded; pin 2 of the resistor R37 is connected to pin 1 of the triode Q6; pin 3 of the triode Q6 is grounded; pin 2 of the triode Q6 is connected to pin 1 of the triode Q3;

the error alarm module (391) comprises a resistor R17, a triode Q10, a diode D2, a resistor R5 and a buzzer; pin 1 of the resistor R17 is connected to pin 1 of the resistor R4; pin 2 of the resistor R17 is connected to pin 1 of the triode Q10; pin 3 of the triode Q10 is grounded; pin 2 of the triode Q10 is connected to pin 2 of the buzzer; two ends of the diode D2 are respectively connected to pin 1 and pin 2 of the buzzer; pin 2 of the resistor R5 is connected to pin 1 of the buzzer; pin 1 of the resistor R5 is connected to the VDD network;

the light display module (43) comprises a resistor R42, a triode Q13, a capacitor C25, a triode Q14, a resistor R43, a resistor R6, a triode Q11, a resistor R12, a red light LED3, a capacitor C18, a resistor R27, a triode Q12, a resistor R1, a capacitor C23 and a green light LED1; pin 1 of the resistor R42 is connected to pin 1 of the resistor R4; pin 2 of the resistor R42 is connected to pin 1 of the triode Q13; pin 3 of the triode Q13 is grounded; pin 2 of the triode Q13 is simultaneously connected to pin 1 of the triode Q12, pin 2 of the resistor R27 and one end of the capacitor C18; pin 3 of the triode Q12 is connected to pin 3 of the triode Q11 and grounded; pin 2 of the triode Q12 is simultaneously connected to pin 2 of the resistor R1 and one end of the capacitor C23; the other end of C23 is simultaneously connected to pin 2 of the triode Q14, pin 1 of the triode Q11 and pin 2 of the resistor R6; pin 2 of the triode Q11 is simultaneously connected to the other end of the capacitor C18 and pin 1 of the resistor R12; pin 2 of the resistor R12 is connected to one end of the red light LED3; pin 1 of the resistor R1 is connected to one end of the green light LED1; pin 1 of the resistor R6 is connected to VDD by way of connection to the other end of the red light LED3, pin 1 of the resistor R27 and the other end of the green light LED1; pin 3 of the triode Q14 is grounded and is connected to one end of the capacitor C25 at the same time; the other end of the capacitor C25 is simultaneously connected to pin 1 of the triode Q14 and pin 2 of the resistor R43; and pin 1 of the resistor R43 is connected to the PM network.

2. The safety control circuit according to claim 1, wherein the model number of the three-terminal voltage-stabilizing chip U3 is 78L05.

3. The safety control circuit according to claim 1, wherein the model number of the D9 and the D3 is 1N4148.

4. The safety control circuit according to claim 1, wherein a resistance value of the resistor R15 is set to be 200 K.

5. The safety control circuit according to claim 1, wherein the model number of the triode Q6 is 8050.

6. The safety control circuit according to claim 1, wherein the model number of the diode D18 is IN5189.

7. The safety control circuit according to claim 1, wherein the model number of the MOS transistor Q8 is 2301.

8. The safety control circuit according to claim 1, wherein the model number of the buzzer is 5V/D1295.

9. An automobile emergency starting clamp, comprising an anode cable clamp (1) provided with a red clip wire OUT+ terminal; a cathode cable clamp (2) provided with a black clip OUT− terminal; and a control box (30), wherein the control box (30) comprises a control box upper shell (301), a control box lower shell (302), an on/off button (303) and the safety control circuit according to claim 1.

10. The automobile emergency starting clamp according to claim 9, wherein the control box upper shell (301) and the control box lower shell (302) are located above and below, respectively, and are fixedly connected to each other; the safety control circuit is arranged between the control box upper shell (301) and the control box lower shell (302); and the on/off button (303) is arranged on one side of the control box upper shell (301) and is in contact connection with the button switch K1 of the safety control circuit.

* * * * *